US012066382B2

United States Patent
Choi et al.

(10) Patent No.: US 12,066,382 B2
(45) Date of Patent: Aug. 20, 2024

(54) METHODS OF MEASURING EXTRACELLULAR VESICLES AND NANOPARTICLES IN COMPLEX MATRICES BY LIGHT SCATTERING

(71) Applicant: LONZA SALES AG, Basel (CH)

(72) Inventors: Young Jun Choi, Cambridge, MA (US); Damian J. Houde, Plymouth, MA (US); Delai Chen, Cambridge, MA (US); Douglas E. Williams, Boston, MA (US)

(73) Assignee: LONZA SALES AG, Basel (CH)

( * ) Notice: Subject to any disclaimer, the term of this patent is extended or adjusted under 35 U.S.C. 154(b) by 38 days.

(21) Appl. No.: 17/254,221

(22) PCT Filed: Jun. 21, 2019

(86) PCT No.: PCT/US2019/038592
§ 371 (c)(1),
(2) Date: Dec. 18, 2020

(87) PCT Pub. No.: WO2019/246591
PCT Pub. Date: Dec. 26, 2019

(65) Prior Publication Data
US 2021/0262931 A1     Aug. 26, 2021

(51) Int. Cl.
*G01N 21/47*      (2006.01)
*G01N 15/00*      (2024.01)
(Continued)

(52) U.S. Cl.
CPC ............. *G01N 21/47* (2013.01); *G01N 15/06* (2013.01); *G01N 21/6486* (2013.01);
(Continued)

(58) Field of Classification Search
CPC .... G01N 21/47; G01N 15/06; G01N 21/6486; G01N 2015/0038; G01N 2015/0053; G01N 2015/0693
See application file for complete search history.

(56) References Cited

U.S. PATENT DOCUMENTS 7,226,752 B1 *   6/2007  Roitman  .......... G01N 33/54306
                                                     435/7.1
9,511,152 B2 *  12/2016  Gao  .................... G01N 21/6486
(Continued)

FOREIGN PATENT DOCUMENTS

WO    WO-2017147719 A1      9/2017
WO    WO-2017175928 A1 *  10/2017   ............. G01N 21/65
(Continued)

OTHER PUBLICATIONS

Bhaduri, B., et al., "Optical Assay of Erythrocyte Function in Banked Blood," Scientific Reports Nature Reports 6211: 1-6, Nature Research, England (Sep. 2014).
(Continued)

*Primary Examiner* — Hina F Ayub
*Assistant Examiner* — Jarreas C Underwood
(74) *Attorney, Agent, or Firm* — MEDLER FERRO WOODHOUSE & MILLS PLLC; Jeffrey K. Mills

(57) ABSTRACT

Described herein are novel rapid and reliable methods of detection of extracellular vesicles and quantifying extracellular vesicle concentrations and absolute number from various sources, including raw cell harvest. The methods described herein comprise detection of light scattering of extracellular vesicles in biological samples. Extracellular vesicles analyzed by the methods of this application have a stereotypical elution profile distinct from known contaminants. The methods described herein are a significant improvement over the state of the art and fulfills an unmet
(Continued)

need in the field of extracellular vesicle manufacturing and quality control.

20 Claims, 18 Drawing Sheets

(51) Int. Cl.
  *G01N 15/06* (2024.01)
  *G01N 15/075* (2024.01)
  *G01N 21/64* (2006.01)

(52) U.S. Cl.
  CPC ............... *G01N 2015/0038* (2013.01); *G01N 2015/0053* (2013.01); *G01N 15/075* (2024.01)

(56) References Cited

U.S. PATENT DOCUMENTS

| | | | | |
|---|---|---|---|---|
| 10,161,850 | B2* | 12/2018 | Artinger | G01N 15/06 |
| 10,195,290 | B1* | 2/2019 | Dooley | C07K 14/70596 |
| 10,545,084 | B2* | 1/2020 | Artinger | G01N 15/06 |
| 10,548,989 | B2* | 2/2020 | Bradbury | A61K 51/0478 |
| 10,568,898 | B2* | 2/2020 | Thaxton | A61K 47/6917 |
| 2008/0118941 | A1* | 5/2008 | Chen | G01N 33/588 435/375 |
| 2010/0297242 | A1* | 11/2010 | Park | C12N 15/88 977/773 |
| 2011/0158910 | A1* | 6/2011 | Dias | A61P 27/16 428/407 |
| 2013/0059316 | A1* | 3/2013 | Geddes | G01N 21/76 422/69 |
| 2013/0177933 | A1* | 7/2013 | Malisauskas | G01N 15/1012 436/87 |
| 2014/0186264 | A1* | 7/2014 | Taylor | G01N 33/57449 424/9.1 |
| 2014/0195264 | A1* | 7/2014 | Kuriyan | G16H 50/20 705/2 |
| 2014/0248210 | A1* | 9/2014 | Bradbury | A61K 51/1244 424/9.4 |
| 2015/0168400 | A1* | 6/2015 | Ichiki | G01N 33/54346 435/7.1 |
| 2015/0207106 | A1* | 7/2015 | Pei | H10K 71/00 257/40 |
| 2015/0369732 | A1* | 12/2015 | Hanlon | G01N 15/0211 356/338 |
| 2017/0131272 | A1* | 5/2017 | DeLong | C12Q 1/68 |
| 2019/0151456 | A1 | 5/2019 | Mcconnell et al. | |
| 2020/0025685 | A1 | 1/2020 | Houde et al. | |
| 2021/0364412 | A1* | 11/2021 | Daaboul | G01N 21/45 |
| 2021/0372933 | A1* | 12/2021 | Xie | G16H 40/63 |

FOREIGN PATENT DOCUMENTS

| | | | | |
|---|---|---|---|---|
| WO | WO-2017221981 | A1 * | 12/2017 | G01N 21/658 |
| WO | WO-2018112154 | A1 | 6/2018 | |
| WO | WO-2019098740 | A1 * | 5/2019 | G01N 33/50 |
| WO | WO-2023090421 | A1 * | 5/2023 | |

OTHER PUBLICATIONS

Bryan, A.K., et al., "Measuring single cell mass, volume, and density with dual suspended microchannel resonators," Lab Chip 14(3):569-576, Royal Society of Chemistry, England (Feb. 2014).

Byun, S., et al., "Characterizing deformability and surface friction of cancer cells," PNAS 110(19):7580-7585, United States National Academy of Sciences, United States (May 2013).

Delgado, F.F., et al., "Intracellular Water Exchange for Measuring the Dry Mass, Water Mass and Changes in Chemical Composition of Living Cells," PLOS ONE 8(9):1-11, PLOS, United States (Jul. 2013).

Gudbergsson, J.M., et al., "Systematic review of factors influencing extracellular vesicle yield from cell cultures," Cytotechnology 68(4):579-592, Springer, Netherlands (Oct. 2015).

Haidekker, M.A., et al., "New fluorescent probes for the measurement of cell membrane viscosity," Chem Biol 8(2):123-131, Cell Press, United States (Feb. 2001).

International Search Report and Written Opinion mailed Sep. 17, 2019, in International Application No. PCT/US2019/038592, EPO, Netherlands, 13 pages.

Lobb, R., et al., "Optimized exosome isolation protocol for cell culture supernatant and human plasma," J. Extracellular Vesicles 4(17):1-11, Wiley Online Library, United States (Jul. 2015).

Melo, S.A., et al., "Glypican-1 identifies cancer exosomes and detects early pancreatic cancer," Nature 523(7559):177-182, Nature Publishing Group, England (Jun. 2015).

* cited by examiner

METHODS OF MEASURING EXTRACELLULAR VESICLES AND NANOPARTICLES IN COMPLEX MATRICES BY LIGHT SCATTERING

FIELD OF DISCLOSURE

The present disclosure relates to the methods of detecting a light scattering signal for the industrial production of biologic or medicinal nanoparticles, e.g., extracellular vesicles (EVs), e.g., exosomes.

BACKGROUND OF THE DISCLOSURE

Nanoparticles such as synthetic nanoparticles, exosomes and other small extracellular vesicles are beginning to be used in commercial processes, including as therapeutics, and are being produced in industrial quantities. Methods of accurately and rapidly measuring nanoparticle presence, purity, concentration and absolute number in complex matrices remain scarce. Current approaches for the detection, isolation and purification of biological nanoparticles such as extracellular vesicles derived from cell culture or other biological samples requires laborious and time-consuming methods. For example, current ultra-centrifugation protocols are commercially unreproducible, as they produce a heterogeneous mix of extracellular vesicles, other cellular vesicles and macromolecular complexes and can lead to vesicle aggregation. Therefore, novel methods for efficient, low-cost and reliable purification and quantification of natural and nanoparticles are needed.

SUMMARY OF THE DISCLOSURE

Disclosed herein are methods for the detection of nanoparticles and extracellular vesicles comprising detecting a light scattering phenomenon without the use of additional dyes, fluorophores, markers, or imaging compounds. In certain embodiments, this application describes methods of detecting nanoparticles or extracellular vesicles comprising, obtaining a sample comprising nanoparticles or extracellular vesicles and determining a light scattering signal from the sample, wherein the light scattering signal is indicative of the presence of the nanoparticles or extracellular vesicles within the sample. In an aspect, the light scattering emission signal is generated using an excitation wavelength that is less than or equal to 25 nm shorter than the detection wavelength. In an aspect, the light scattering emission signal is generated using an excitation wavelength that is less than or equal to 25 nm longer than the detection wavelength. In an aspect, the light scattering excitation wavelengths ranges from 280 nm to 700 nm, and the emission wavelength is less than or equal to 25 nm longer than the excitation wavelength. In an aspect, the light scattering excitation wavelengths ranges from 280 nm to 700 nm, and the emission wavelength is less than or equal to 25 nm shorter than the excitation wavelength. In an aspect, the light scattering emission signal is determined at an emission wavelength range of 445-485 nm. In an aspect, the light scattering emission signal is determined at an emission wavelength range of 450-470 nm. In an aspect. the light scattering emission signal is determined at an emission wavelength of 460 nm. In an aspect, the light scattering emission signal is determined at an excitation wavelength range of 350-470 nm. In an aspect, the light scattering emission signal is determined at an excitation wavelength range of 380-460 nm. In an aspect, the light scattering emission signal is determined at an excitation wavelength of 460 nm. In an aspect, the light scattering emission signal is determined at an excitation wavelength of 460 nm and an emission of 470 nm. In an aspect, the light scattering emission signal is determined at an excitation wavelength of 460 nm and an emission of 450 nm. In an aspect, the light scattering excitation and emission signals are the same wavelength. In an aspect, the light scattering excitation and emission signals are both 460 nm. In some embodiments, the excitation wavelengths are less than 519 nm or greater than 560 nm. In some embodiments, the excitation wavelengths are neither 519 nm nor 560 nm.

In certain aspects, the sample is separated into fractions prior to determining said light scattering emission signal. In certain aspects, separation comprises a column chromatography separation step. In certain aspects, separation comprises two column chromatography separation steps. In an aspect, one or both of the chromatography steps is size exclusion chromatography. In an aspect, one or both of the chromatography is ion exchange chromatography. In an aspect, said ion exchange chromatography is strong anion exchange chromatography. In an aspect, said two chromatography steps are anion-exchange chromatography and size-exclusion chromatography. In an aspect, said anion-exchange chromatography precedes said size-exclusion chromatography.

In certain aspects, the said light scattering emission signal is determined using a flow cell. In certain aspects, the sample is subjected to a filtration step prior to determining said light scattering emission signal. In certain aspects, the sample is subjected to a centrifugation separation step prior to determining said light scattering emission signal. In certain aspects, the sample is subjected to a sucrose density gradient step prior to determining said light scattering emission signal. In certain aspects, the sample is subjected to a separation step comprising use of a density gradient medium prior to determining said light scattering emission signal. In certain aspects, the said light scattering emission signal is determined using a cuvette, a microtiter plate, chromatography, capillary electrophoresis, flow cell, field flow fractionation device, nanoDLD array, flow cytometry, analytical ultracentrifuges, or any other vessel that is suitable to contain biological samples. In certain aspects, the said light scattering emission signal is determined for a sample of nanoparticles and/or extracellular vesicles that is substantially purified. In certain aspects, the said light scattering emission signal is determined from a sample of nanoparticles and/or extracellular vesicles that is in a complex matrix comprising a plurality of macromolecules. In certain aspects, said complex matrix is a cell culture media sample. In certain aspects, said complex matrix is blood, serum, or other body fluids derived from an organism such as a human.

In certain aspects, the sample is derived from a cell culture. In certain aspects, the cell culture comprises human embryonic kidney cells, mesenchymal stem cells or neuronal cells. In certain aspects, the sample is derived from a body fluid of an animal.

In certain aspects, the method comprises determining an amount of the nanoparticles and/or extracellular vesicles within the sample comprising comparing the light scattering emission signal to the light scattering emission signal of a standard. In certain aspects, the method comprises quantifying the amount of nanoparticles and/or extracellular vesicles within the sample, based upon the area under of the curve of a chromatogram comprising the light scattering emission signal. In certain aspects, the method comprises determining an amount of the nanoparticles and/or extracellular vesicles within the sample comprising comparing the light scattering emission signal to the luminescence signal of a standard. In certain aspects, the luminescence signal is derived from a luminescence proximity assay. In certain aspects, the luminescence proximity assay is an ALPHASCREEN™ assay recognizing exosome-associated proteins such as CD9, CD63, PTGFRN, and/or CD81. In certain aspects, the luminescence proximity assay is used to detect exosomes independent of their light scattering emission signal.

In certain aspects, the nanoparticle is a ribosome, lipoprotein, chylomicron, or a synthetic nanoparticle.

In certain aspects, the synthetic nanoparticle is a liposome. In certain aspects, the synthetic nanoparticle is a synthetic bead, e.g., a polystyrene bead. In certain aspects, the synthetic nanoparticle is not metal, e.g., is not made of gold, silver, or one or more metals. In certain aspects, the synthetic nanoparticle and/or extracellular vesicle is not plasmonic. In certain aspects, the synthetic nanoparticle and/or extracellular vesicle is predominantly spherical. In certain aspects, the synthetic nanoparticle and/or extracellular vesicle is between 20 nm and 300 nm in diameter.

In certain aspects, the extracellular vesicle is an exosome. In certain aspects, the extracellular vesicle is a nanovesicle.

In certain aspects, the extracellular vesicle comprises a therapeutic payload.

In certain aspects, provided herein is a method of detecting nanoparticles, provided measuring the light scattering signature of said nanoparticles. In certain aspects, the method comprises providing a sample comprising nanoparticles, providing a first light signal to the sample and determining a second light signal emitted from the sample, thereby detecting the nanoparticles. In some embodiments, the nanoparticles are extracellular vesicles, for example exosomes. In certain aspects, the method does not require any labeling step such as a fluorescent labeling step. In certain aspects, said nanoparticles exist in a heterogeneous mixture, such as cell culture or a body fluid from an animal. In certain aspects, said nanoparticles are partially purified or substantially purified.

Certain aspects of the present disclosure are directed to a method of detecting nanoparticles in a sample, comprising measuring a light scattering signal emitted from the nanoparticles in the sample ("emission signal") after the sample is excited a light source. In some aspects, the light scattering emission signal is not fluorescence.

In some aspects, the light source has excitation wavelength ranging from about 280 nm to about 700 nm. In some aspects, the light source has an excitation wavelength ranging from about 300 nm to about 700 nm, from about 320 nm to about 700 nm, from about 340 nm to about 700 nm, from about 360 nm to about 700 nm, from about 380 nm to about 700 nm, from about 400 nm to about 700 nm, from about 420 nm to about 700 nm, from about 440) nm to about 700 nm, from about 460 nm to about 700 nm, from about 300 nm to about 660 nm, from about 320 nm to about 660 nm, from about 340) nm to about 660 nm, from about 360 nm to about 660 nm, from about 380 nm to about 660 nm, from about 400 nm to about 660 nm, from about 420 nm to about 660 nm, from about 440) nm to about 660 nm, from about 460 nm to about 660 nm, from about 300 nm to about 640 nm, from about 320 nm to about 640) nm, from about 340) nm to about 640) nm, from about 360 nm to about 640 nm, from about 380 nm to about 640) nm, from about 400 nm to about 640) nm, from about 420 nm to about 640 nm, from about 440) nm to about 640) nm, from about 460 nm to about 640) nm, from about 400 nm to about 600 nm, from about 400 nm to about 500 nm, from about 450 nm to about 500 nm, from about 420 nm to about 520 nm, or from about 440 nm to about 540) nm. In some aspects, the light source has an excitation wavelength ranging from about 400 nm to about 500 nm.

In some aspects, the light scattering emission signal has an emission wavelength equal to or longer than the excitation wavelength. In some aspects, the emission wavelength is less than about 20 nm, less than about 19 nm, less than about 18 nm, less than about 17 nm, less than about 16 nm, less than about 15 nm, less than about 14 nm, less than about 13 nm, less than about 12 nm, less than about 11 nm, less than about 10) nm, less than about 9 nm, less than about 8 nm, less than about 7 nm, less than about 6 nm, less than about 5 nm, less than about 4 nm, less than about 3 nm, less than about 2 nm, or less than about 1 nm longer than the excitation wavelength.

In some aspects, the emission wavelength is about 1 nm to about 20 nm, about 1 nm to about 19 nm, about 1 nm to about 18 nm, about 1 nm to about 17 nm, about 1 nm to about 16 nm, about 1 nm to about 15 nm, about 1 nm to about 14 nm, about 1 nm to about 13 nm, about 1 nm to about 12 nm, about 1 nm to about 11 nm, about 1 nm to about 10 nm, about 1 nm to about 9 nm, about 2 nm to about 20 nm, about 2 nm to about 19 nm, about 2 nm to about 18 nm, about 2 nm to about 17 nm, about 2 nm to about 16 nm, about 2 nm to about 15 nm, about 2 nm to about 14 nm, about 2 nm to about 13 nm, about 2 nm to about 12 nm, about 2 nm to about 11 nm, about 2 nm to about 10 nm, about 2 nm to about 9 nm, about 3 nm to about 20 nm, about 3 nm to about 19 nm, about 3 nm to about 18 nm, about 3 nm to about 17 nm, about 3 nm to about 16 nm, about 3 nm to about 15 nm, about 3 nm to about 14 nm, about 3 nm to about 13 nm, about 3 nm to about 12 nm, about 3 nm to about 11 nm, about 3 nm to about 10 nm, about 3 nm to about 9) nm, about 4 nm to about 20 nm, about 4 nm to about 19 nm, about 4 nm to about 18 nm, about 4 nm to about 17 nm, about 4 nm to about 16 nm, about 4 nm to about 15 nm, about 4 nm to about 14 nm, about 4 nm to about 13 nm, about 4 nm to about 12 nm, about 4 nm to about 11 nm, about 4 nm to about 10 nm, about 4 nm to about 9 nm, about 5 nm to about 20 nm, about 5 nm to about 19 nm, about 5 nm to about 18 nm, about 5 nm to about 17 nm, about 5 nm to about 16 nm, about 5 nm to about 15 nm, about 5 nm to about 14 nm, about 5 nm to about 13 nm, about 5 nm to about 12 nm, about 5 nm to about 11 nm, about 5 nm to about 10 nm, about 5 nm to about 9 nm, about 6 nm to about 20) nm, about 6 nm to about 19 nm, about 6 nm to about 18 nm, about 6 nm to about 17 nm, about 6 nm to about 16 nm, about 6 nm to about 15 nm, about 6 nm to about 14 nm, about 6 nm to about 13 nm, about 6 nm to about 12 nm, about 6 nm to about 11 nm, about 6 nm to about 10 nm, about 6 nm to about 9 nm, about 7 nm to about 20 nm, about 7 nm to about 19 nm, about 7 nm to about 18 nm, about 7 nm to about 17 nm, about 7 nm to about 16 nm, about 7 nm to about 15 nm, about 7 nm to about 14 nm, about 7 nm to about 13 nm, about 7 nm to about 12 nm, about 7 nm to about 11 nm, about 7 nm to about 10 nm, about 7 nm to about 9 nm, about 8 nm to about 20 nm, about 8 nm to about 19 nm, about 8 nm to about 18 nm, about 8 nm to about 17 nm, about 8 nm to about 16 nm, about 8 nm to about 15 nm, about 8 nm to about 14 nm, about 8 nm to about 13 nm, about 8 nm to about 12 nm, about 8 nm to about 11 nm, about 8 nm to about 10 nm, about 8 nm to about 9 nm, about 9 nm to about 20 nm, about 9 nm to about 19 nm, about 9 nm to about 18 nm, about 9 nm to about 17 nm, about 9 nm to about 16 nm, about 9 nm to about 15 nm, about 9 nm to about 14 nm, about 9 nm to about 13 nm, about 9 nm to about 12 nm, about 9 nm to about 11 nm, about 9 nm to about 10 nm, about 10 nm to about 20 nm, about 10 nm to about 19 nm, about 10 nm to about 18 nm, about 10 nm to about 17 nm, about 10 nm to about 16 nm, about 10 nm to about 15 nm, about 10 nm to about 14 nm, about 10 nm to about 13 nm, about 10 nm to about 12 nm, or about 10 nm to about 11 nm longer than the excitation wavelength. In some aspects, the difference between the emission and excitation wavelengths ranges from about 5 nm to about 20 nm. In some aspects, the difference between the emission and excitation wavelengths ranges from about 10 nm to about 20 nm.

In some aspects, the difference between the emission and excitation wavelengths is selected from a group comprising 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, and 20 nm.

In some aspects, the light source has an excitation wavelength at about 300 nm, about 310 nm, about 320 nm, about 330 nm, about 340 nm, about 350 nm, about 360 nm, about 370 nm, about 380 nm, about 390 nm, about 400 nm, about 410 nm, about 420 nm, about 430 nm, about 440 nm, about 450 nm, about 460 nm, about 470 nm, about 480 nm, about 490 nm, about 500 nm, about 510 nm, about 520 nm, about 530 nm, about 540 nm, about 550 nm, about 560 nm, about 570 nm, about 580 nm, about 590 nm, about 600 nm, about 610 nm, about 620 nm, about 630 nm, about 640 nm, about 650 nm, about 660 nm, about 670 nm, about 680 nm, about 690 nm, or about 700 nm. In some aspects, the emission wavelength is between 300 nm and about 320 nm, between 310 nm and about 330 nm, between 320 nm and about 340 nm, between 330 nm and about 350 nm, between 340 nm and about 360 nm, between 350 nm and about 370 nm, between 360 nm and about 380 nm, between 370 nm and about 390 nm, between 380 nm and about 400 nm, between 390 nm and about 410 nm, between 400 nm and about 420 nm, between 410 nm and about 430 nm, between 420 nm and about 440 nm, between 430) nm and about 450 nm, between 440 nm and about 460 nm, between 450 nm and about 470) nm, between 460 nm and about 480 nm, between 470 nm and about 490) nm, between 480 nm and about 500 nm, between 490 nm and about 510 nm, between 500 nm and about 520 nm, between 510 nm and about 530 nm, between 520 nm and about 540) nm, between 530) nm and about 550) nm, between 540) nm and about 560 nm, between 550 nm and about 570) nm, between 560 nm and about 580 nm, between 570) nm and about 590 nm, between 580 nm and about 600 nm, between 590 nm and about 610 nm, between 600 nm and about 620 nm, between 610 nm and about 630 nm, between 620 nm and about 640) nm, between 630 nm and about 650 nm, between 640 nm and about 660 nm, between 650 nm and about 670 nm, between 660 nm and about 680 nm, between 670 nm and about 690 nm, between 680 nm and about 700 nm, between 690 nm and about 710 nm, or between 700 nm and about 720 nm, respectively.

In some aspects, the light source has an excitation wavelength at about 450 nm to about 470 nm. In some aspects, the excitation wavelength is about 460 nm and the emission wavelength is about 460 nm to about 480 nm. In some aspects, the excitation wavelength is about 460) nm and the emission wavelength is about 460 nm, about 465 nm, about 470 nm, about 475 nm, or about 480) nm. In some aspects, the excitation wavelength is about 450 nm and the emission wavelength is about 450 nm to about 470) nm. In some aspects, the excitation wavelength is about 450 nm and the emission wavelength is about 450 nm, about 455 nm, about 460) nm, about 465 nm, or about 470 nm. In some aspects, the excitation wavelength is about 470 nm and the emission wavelength is about 470 nm to about 490 nm. In some aspects, the excitation wavelength is about 470 nm and the emission wavelength is about 470 nm, about 475 nm, about 480) nm, about 485 nm, or about 490 nm.

In some aspects, the excitation wavelength is about 550 nm to about 560 nm and the emission wavelength is about 550 nm to about 580 nm and wherein the excitation wavelength is the same or shorter than the emission wavelength. In some aspects, the excitation wavelength is about 556 nm and the emission wavelength is about 556 nm, about 560 nm, about 565 nm, about 570) nm, or about 573 nm. In some aspects, the light scattering emission signal is measured by a UV/Vis detector or a fluorescence detector.

In some aspects, the light scattering emission signal is measured during one or more batch release assays. In some aspects, one of the batch release assays is a size exclusion chromatography (SEC). In some aspects, the SEC comprises one or more elution steps. In some aspects, the nanoparticles are eluted in at least one of the elution steps.

In some aspects, the light scattering emission signal indicates the purity of the nanoparticles in the sample. In some aspects, the light scattering emission signal indicates the presence of contaminants in the sample. In some aspects, the light scattering emission signal indicates the concentration of the nanoparticles in the sample. In some aspects, the light scattering emission signal indicates the concentration of contaminants in the sample.

In some aspects, the method further comprises measuring intrinsic fluorescence of the nanoparticles in the sample. In some aspects, the intrinsic fluorescence is measured after the nanoparticles of the sample are excited at an excitation wavelength of about 280 nm to about 700 nm. In some aspects, the excitation wavelength is about 280 nm.

In some aspects, the intrinsic fluorescence is emitted at a wavelength ranging from about 290 nm to about 700 nm, about 300 nm to about 700 nm, about 310 nm to about 700 nm, about 320 nm to about 700 nm, about 330 nm to about 700 nm, about 340 nm to about 700 nm, or about 350 nm to about 700 nm. In some aspects, the intrinsic fluorescence is emitted at a wavelength of about 300 nm, about 350 nm, about 400 nm, about 450 nm, about 500 nm, about 550 nm, about 600 nm, about 650 nm, or about 700 nm. In some aspects, the excitation wavelength is about 280 nm, and the intrinsic fluorescence is emitted at a wavelength of about 350 nm.

In some aspects, both the light scattering emission signal and the intrinsic fluorescence are measured during one or more release assays. In some aspects, one of the release assays is a size exclusion chromatography (SEC). In some aspects, the SEC comprises one or more elution steps. In some aspects, the nanoparticles are eluted in at least one of the elution steps.

In some aspects, the intrinsic fluorescence indicates the purity of the nanoparticles in the sample. In some aspects, the intrinsic fluorescence indicates the presence of contaminants in the sample. In some aspects, the intrinsic fluorescence indicates the concentration of the nanoparticles in the sample. In some aspects, the intrinsic fluorescence indicates the concentration of the contaminants in the sample. In some aspects, the intrinsic fluorescence is measured by a fluorescence detector. In some aspects, the intrinsic fluorescence is measured prior to the light scattering signal. In some aspects, the intrinsic fluorescence is measured after the light scattering signal. I n some aspects, the method further comprises measuring a UV absorbance of the nanoparticles in the sample. In some aspects, the UV absorbance is measured at 280 nm after the sample is excited by a UV light at the wavelength of 280 nm. In some aspects, the UV absorbance is measured by a UV/Vis detector.

In some aspects, the release assays are subjected to Food and Drug Agency (FDA) guidelines, Good Manufacturing Practice (GMP) for biologic drug or to GMP for Medicinal Products for Human and Veterinary Use.

In some aspects, the release assays are performed to demonstrate that the nanoparticles in the sample are within regulatory tolerance. In some aspects, the release assays are performed to record that the nanoparticles in the sample are within regulatory tolerance.

BRIEF DESCRIPTION OF THE DRAWINGS

These and other features, aspects, and advantages of the present disclosure will become better understood with regard to the following description, and accompanying drawings, where.

DETAILED DESCRIPTION

Figure 1:
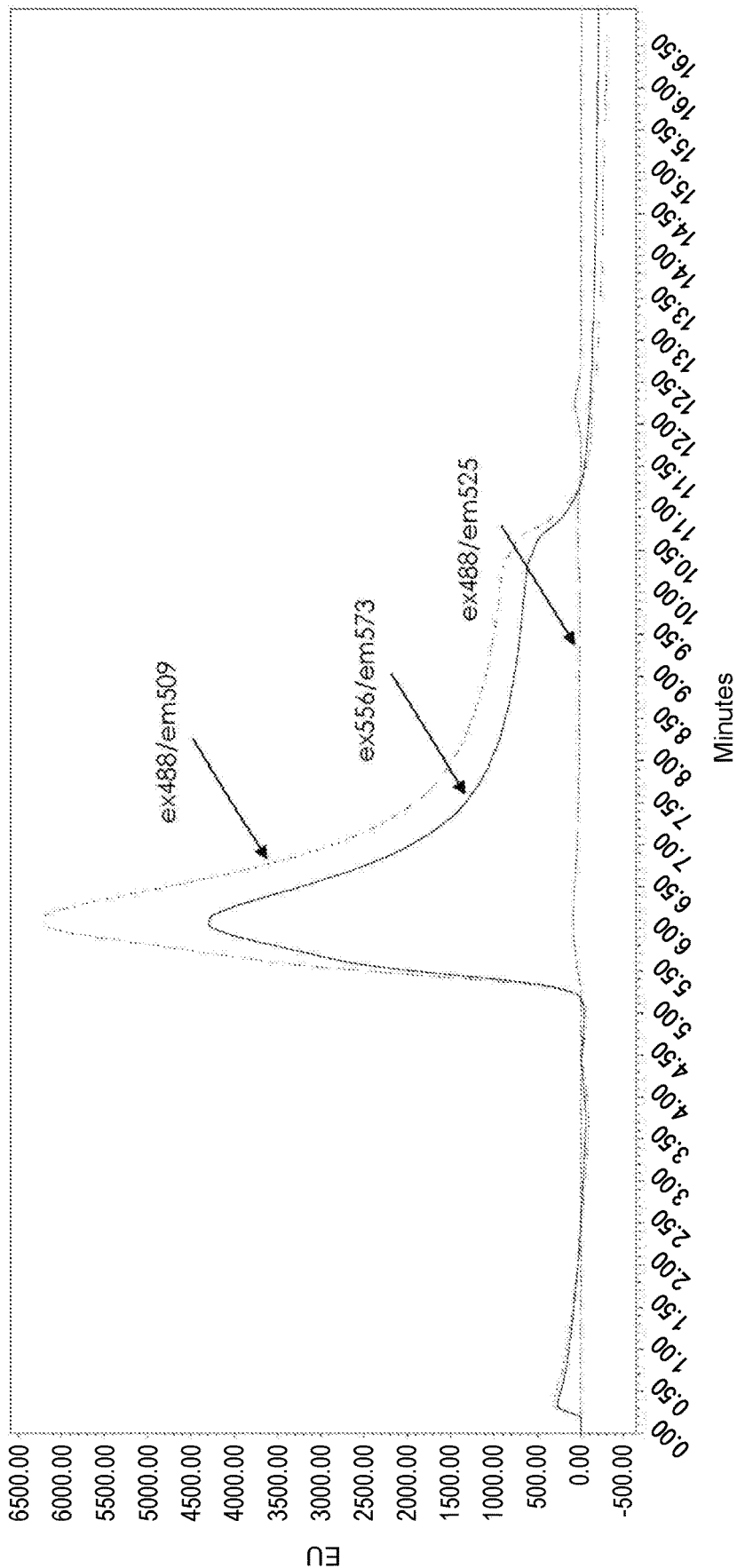
FIG. 1 shows an SEC trace of liposomes detected at 488 nm excitation/509 nm emission (ex488/em509): ex556/em573; and ex488/em525.

Briefly, and as described in more detail below, is a rapid and reliable method of quantifying nanoparticle and extracellular vesicle concentrations and absolute number from various sources, including raw cell harvest without the use of additional dyes, fluorophores, markers, or imaging compounds. In addition, the other proteinaceous particles in the samples could be distinguished from the manufactured nanoparticles and extracellular vesicles using the methods disclosed herein. Nanoparticle and extracellular vesicle detection and quantification typically relies on nanoparticle tracking assays and other methods that are heavily dependent on the purity of particle preparations, and often rely on the addition of lipophilic dyes or other compounds and/or agents to aid in the detection of particles.

Extracellular vesicles analyzed by the methods of the disclosure have a stereotypical elution profile as measured by light scattering distinct from known contaminants. The methods described herein are a significant improvement over the state of the art and fulfill an unmet need in the field of extracellular vesicle manufacturing and quality control.

I. Definitions

Terms used in the claims and specification are defined as set forth below unless otherwise specified.

It is to be noted that the term "a" or "an" entity refers to one or more of that entity: for example, "a nucleotide sequence," is understood to represent one or more nucleotide sequences. As such, the terms "a" (or "an"), "one or more," and "at least one" can be used interchangeably herein.

Furthermore, "and/or" where used herein is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following aspects: A, B, and C: A, B, or C: A or C: A or B; B or C: A and C: A and B: B and C: A (alone): B (alone): and C (alone).

It is understood that wherever aspects are described herein with the language "comprising," otherwise analogous aspects described in terms of "consisting of" and/or "consisting essentially of" are also provided.

Unless defined otherwise, all technical and scientific terms used herein have the same meaning as commonly understood by one of ordinary skill in the art to which this disclosure is related. For example, the Concise Dictionary of Biomedicine and Molecular Biology, Juo, Pei-Show, 2nd ed., 2002, CRC Press: The Dictionary of Cell and Molecular Biology, 3rd ed., 1999, Academic Press: and the Oxford Dictionary Of Biochemistry And Molecular Biology, Revised, 2000, Oxford University Press, provide one of skill with a general dictionary of many of the terms used in this disclosure.

Units, prefixes, and symbols are denoted in their Système International de Unites (SI) accepted form. Numeric ranges are inclusive of the numbers defining the range. Unless otherwise indicated, nucleotide sequences are written left to right in 5' to 3' orientation. Amino acid sequences are written left to right in amino to carboxy orientation. The headings provided herein are not limitations of the various aspects of the disclosure, which can be had by reference to the specification as a whole. Accordingly, the terms defined immediately below are more fully defined by reference to the specification in its entirety.

The term "about" is used herein to mean approximately, roughly, around, or in the regions of. When the term "about" is used in conjunction with a numerical range, it modifies that range by extending the boundaries above and below the numerical values set forth. In general, the term "about" can modify a numerical value above and below the stated value by a variance of, e.g., 10 percent, up or down (higher or lower).

As used herein, the term "light scattering" refers to scattering and/or reflection of a light source from a focal beam. In some embodiments, the light scattering can be detected at a single angle from the source (e.g., 90 degrees), or can be detected at multiple angles (e.g., in the case of multi-angle light scattering). In some embodiments, the light source is a laser. In some embodiments, the light source is at a wavelength in the ultraviolet spectrum, the visual spectrum, the infrared spectrum, or combinations thereof. In some embodiments, the light scattering is elastic. In some embodiments the light scattering is inelastic. In some preferred embodiments, the light scattering is Rayleigh (elastic) light scattering.

As used herein, the term "excitation wavelength" refers to a wavelength of a light source used to excite the samples. The wavelengths of a light source are controlled by appropriate filters to block or pass specific wavelengths. The excitation wavelength corresponds inversely to the radiation energy of the light source, i.e., longer excitation wavelengths indicate lower radiation energy, while shorter excitation wavelengths indicate higher radiation energy. The term "excitation wavelength" is used interchangeably with "absorbance wavelength" or "absorption wavelength."

As used herein, the term "emission wavelength" refers to the wavelength of a signal emitted, which is then detected by a detector. Emission signals can be emitted as a result of light scattering after nanoparticles are excited by a light source. In some aspects, the light scattering is inelastic. In some aspects, the light scattering is Rayleigh (elastic) light scattering. In some aspects, the light source can be fluorescence, and the emission wavelength is a wavelength of fluorescence. In some aspects, the fluorescence are intrinsic fluorescence. The term "intrinsic fluorescence" refers to a fluorescence naturally occurring after excitation. Such intrinsic fluorescence can occur when molecules such as aromatic amino acids, neurotransmitters, porphyrins, and green fluorescent protein are excited. In contrast, extrinsic fluorescence is emitted from synthetic dyes or modified biochemical molecules that are added to a sample. In some aspects, the detector for fluorescence signal can be a UV/Vis detector. In some aspects, the detector can be a fluorescence detector. In some aspects, the detector can be a multi-wavelength detector.

As used herein, the term "separation" or "fractionation" refers to a process in which a certain quantity of a sample is divided into a number of smaller quantities (fraction) in which the compositions vary. In some aspects, the sample is a mixture. In some aspects, the mixture is a suspension. Fractions are collected based on differences in specific property of individual components. The difference properties on which the separation process is based can be chemical or physical including such properties as chemical reactivity, solubility, molecular size, electrical charge and change-of-phase temperatures such as boiling and freezing points. Separation or fractionation techniques can be broadly classified into processes of mechanical separation and separation by diffusion. Mechanical separation techniques can be based on particle size, density and electrical or magnetic mobility. Separation by diffusion includes chromatographic separation, extraction and fractionation. In some aspects, the fractions are nanoparticles. Broad groupings of such methods and techniques include fractionation proper, general separation, analytical separation and purification. Examples of separation or fractionation can be, but not limited to, dephlegmation, fractional distillation, fractional freezing, fractional melting, isotope fractionation, solvent or clean fractionation, thermal diffusion, centrifugation, ultracentrifugation, gaseous diffusion, chromatography, bioassay-guided fractionation, geochemical fractionation, and purification. In some aspects, the separation or fractionation takes place in column chromatography by a difference in affinity between the stationary phase of the column and the mobile phase of the sample. In some aspects, the column chromatography is size exclusion chromatography (SEC). SEC is a chromatographic method in which molecules in solution are separated by their size, and in some cases molecular weight. It is usually applied to large molecules or macromolecular complexes such as proteins and polymers. The chromatography column can be packed with fine, porous beads which are composed of dextran polymers (SEPHADEX®), agarose (SEPHAROSE®), or polyacrylamide. The pore sizes of these beads are used to estimate the dimensions of macromolecules. In some aspects, the SEC comprises one or more elution steps.

As used herein, the term "batch release assay", "batch release test", or "lot release assay" refers to the measurement methods described herein that can be used in the lot or batch release assays that are subjected to Good Manufacturing Practice (GMP) for biologic drug or to GMP for Medicinal Products for Human and Veterinary Use. The purpose of testing and controlling batch release is to ensure that the batch has been manufactured and checked in accordance with the principles and guidelines of GMP, and the relevant records are readily identifiable for future inspection. The release assays can also provide the deviation measurements for the manufacturing process and/or the analytical control methods. The deviation can be assessed in accordance with a quality risk management process using an appropriate approach under the GMP guidelines. The suite of tests (including specifications and details of laboratory methodologies where appropriate) is agreed between the pharmaceutical manufacturer in consultation with regulators during the application for marketing approval. The specific tests vary widely between product types, their mechanisms of action and manufacturing processes. However, a laboratory will typically analyze the physical characteristics of batch samples (for tablets, this could be their color, shape, solubility, etc.) along with a host of tests on the active ingredients to ensure that their concentrations (and any degradation products) are within regulatory tolerance and the manufacturer's own tolerance range (usually 2-5%). Finally, the samples will undergo microbiological and chemical scrutiny to verify the product contains no hazardous materials (for example remnants of the manufacturing process). In some aspects, the physical characteristics of extracellular vesicles (EVs) and nanoparticles manufactured can be measured during one or more release assays. In some aspects, the light scattering at various excitation and emission wavelengths, the intrinsic fluorescence, and the UV absorbance of the EVs and nanoparticles in a batch are measured and recorded to detect and/or quantify the sizes, purity, and concentration of the EVs and nanoparticles in the production. In some aspects, the light scattering signal is measured at the excitation wavelength of 460 nm and the emission wavelength at 470 nm. In some aspects, the intrinsic fluorescence is measured at the excitation wavelength of 280 nm and the emission wavelength at 350 nm. In some aspects, the UV absorbance is measured at the wavelength of 280 nm. In some aspects, other measurements to assess the identity and concentration of the nanoparticles (e.g., extracellular vesicles) described herein can be included in the release assays.

As used herein, "nanoparticle" refers to a small physical entity that is between 1 nm and 1,000 nm in size as measured by its longest axis (e.g., its diameter if spherical). Nanoparticles may be produced by cells or may be synthetic, or a combination or mixture thereof. Nanoparticles may be monodisperse, polydisperse, homogeneous, or heterogeneous. Nanoparticles may exist in a complex mixture of various excipients, salts, biological material, synthetic material, matrices, gels, or other formulations known in the art, whether natural or synthetic. In a nonlimiting example, a virus-like particle (VLP) is a species of nanoparticle.

As used herein, the term "extracellular vesicle" or "EV" refers to a cell-derived vesicle comprising a membrane that encloses an internal space. Extracellular vesicles comprise all membrane-bound vesicles (e.g., exosomes or nanovesicle) that have a smaller diameter than the cell from which they are derived. In some aspects, extracellular vesicles range in diameter from 20 nm to 1000 nm, and may comprise various macromolecular cargo either within the internal space (i.e., lumen), displayed on the external surface of the extracellular vesicle, and/or spanning the membrane. In some aspects, the payload can comprise nucleic acids, proteins, carbohydrates, lipids, small molecules, and/or combinations thereof. In certain aspects, an extracellular vehicle comprises a scaffold moiety. By way of example and without limitation, extracellular vesicles include apoptotic bodies, fragments of cells, vesicles derived from cells by direct or indirect manipulation (e.g., by serial extrusion or treatment with alkaline solutions), vesiculated organelles, and vesicles produced by living cells (e.g., by direct plasma membrane budding or fusion of the late endosome with the plasma membrane). Extracellular vesicles may be derived from a living or dead organism, explanted tissues or organs, prokaryotic or eukaryotic cells, and/or cultured cells. In some aspects, the extracellular vesicles are produced by cells that express one or more transgene products. An extracellular vesicle is a species of nanoparticle.

As used herein, the term "nanovesicle" refers to a cell-derived small (between 20-250 nm in diameter, e.g., between 30-150 nm) vesicle comprising a membrane that encloses an internal space, and which is generated from a cell (e.g., producer cell) by direct or indirect manipulation such that the nanovesicle would not be produced by the producer cell without the manipulation. Appropriate manipulations of the producer cell include but are not limited to serial extrusion, treatment with alkaline solutions, sonication, or combinations thereof. Generally, production of nanovesicles does not result in the destruction of the producer cell. In some aspects, populations of nanovesicles are substantially free of vesicles that are derived from producer cells by way of direct budding from the plasma membrane or fusion of the late endosome with the plasma membrane. In certain aspects, a nanovesicle comprises a scaffold moiety. Nanovesicles, once derived from a producer cell, can be isolated from the producer cell based on its size, density, biochemical parameters, or a combination thereof. The nanovesicle comprises lipid or fatty acid and polypeptide, and optionally comprises a payload (e.g., a therapeutic agent), a receiver (e.g., a targeting moiety), a polynucleotide (e.g., a nucleic acid, RNA, or DNA), a sugar (e.g., a simple sugar, polysaccharide, or glycan) or other molecules. The nanovesicle, once it is derived from a producer cell according to the manipulation, may be isolated from the producer cell based on its size, density, biochemical parameters, or a combination thereof. A nanovesicle is a species of extracellular vesicle.

As used herein, the term "exosome" refers to a cell-derived small (between 20-300 nm in diameter, e.g., between 40-200 nm) vesicle comprising a membrane that encloses an internal space (i.e., lumen), and in some aspects, can be generated from a cell (e.g., producer cell) by direct plasma membrane budding or by fusion of the late endosome with the plasma membrane. In certain aspects, an exosome comprises a scaffold moiety. Generally, production of exosomes does not result in the destruction of the producer cell. The exosome comprises lipid or fatty acid and polypeptide, and optionally comprises a payload (e.g., a therapeutic agent), a receiver (e.g., a targeting moiety), a polynucleotide (e.g., a nucleic acid, RNA, or DNA), a sugar (e.g., a simple sugar, polysaccharide, or glycan) or other molecules. As described infra, the exosome can be derived from a producer cell, and isolated from the producer cell based on its size, density, biochemical parameters, or a combination thereof. An exosome is a species of extracellular vesicle. In some aspects, the EVs, e.g., exosomes, of the present disclosure are produced by cells that express one or more transgene products.

As used herein, the terms "parent cell" or "producer cell" include any cell from which an extracellular vesicle may be isolated. The terms also encompass a cell that shares a protein, lipid, sugar, or nucleic acid component of the extracellular vesicle. For example, a "parent cell" or "producer cell" may include a cell which serves as a source for the extracellular vesicle membrane.

As used herein, the term "synthetic nanoparticle" is a small (between 1-1,000 nm as measured by its longest axis) object or structure that is not produced from living cells. Synthetic nanoparticles may contain biological macromolecules such as lipids, proteins, nucleic acids and/or carbohydrates, but cannot be produced by living cells. A liposome, lipid nanoparticle, detergents, other polymeric structures, a synthetic bead (e.g., polystyrene bead, quantum dot, or metal bead) and a DNA nanostructure are all species of synthetic nanoparticle. In some embodiments, the synthetic nanoparticle is spherical or near-spherical.

As used herein, the terms "purify," "purified," and "purifying" or "isolate," "isolated," or "isolating" or "enrich," "enriched" or "enriching" are used interchangeably and refer to the state of a population (e.g., a plurality of known or unknown amount and/or concentration) of desired extracellular vesicles, that have undergone one or more processes of purification, e.g., a selection or an enrichment of the desired extracellular vesicles composition, or alternatively a removal or reduction of residual biological products as described herein. In some embodiments, a purified extracellular vesicles composition has no detectable undesired activity or, alternatively, the level or amount of the undesired activity is at or below an acceptable level or amount. In other embodiments, a purified extracellular vesicle composition has an amount and/or concentration of desired extracellular vesicles at or above an acceptable amount and/or concentration. In other embodiments, the purified extracellular vesicle composition is enriched as compared to the starting material (e.g., biological material collected from tissue, bodily fluid, or cell preparations) from which the composition is obtained. This enrichment may be by 10%, 20%, 30%, 40%, 50%, 60%, 70%, 80%, 90%, 95%, 96%, 97%, 98%, 99%, 99.9%, 99.99%, 99.999%, 99.9999%, or greater than 99.9999% as compared to the starting material. The term "purity" as used herein, refers to the amount and/or concentration of desired extracellular vesicles or nanoparticles over the total amount of the samples. As used herein, the term "contaminant" or "impurity" refers to the fractions (e.g., proteinaceous species, cellular debris, raptured extracellular vesicles or nanoparticles, microvesicles, apoptotic debris, or other impurities) other than the desired extracellular vesicles or nanoparticles in the samples.

Abbreviations used in this application include the following: Size-exclusion chromatography (SEC), Anion Exchange Chromatography (AEX), Two-dimensional liquid chromatography (2D-LC), Nanoparticle tracking analysis (NTA), Resistive pulse sensing (RPS), extracellular vesicles (EV or EVs), Phosphate Buffered Saline (PBS) and Fluorescent Activated Cell Sorting (FACS).

II. Methods of the Disclosure

II.A. Sources of Extracellular Vesicles

Described herein are methods for the detection and quantification of extracellular vesicles from complex matrices such as biological samples. Biological samples can include, but are not limited to, raw cell culture harvest, clarified cell culture medium, enriched extracellular vesicle preparations, partially purified extracellular vesicle preparations (e.g., by a single two-hour ultracentrifugation step), or highly purified extracellular vesicle preparations (e.g., extracellular vesicle preparations additionally purified using a density gradient medium (e.g., sucrose density gradient medium or medium comprising an iodixanol solution (Sigma-Aldrich))).

The parent cell can be cultured. Cultured parent cells can be scaled up from bench-top scale to bioreactor scale. For example, the parent cells are cultured until they reach saturation density, e.g., $1\times10^5$, $1\times10^6$, $1\times10^7$, or greater than $1\times10^7$ complexes per ml. Optionally, upon reaching saturation density, the parent cells can be transferred to a larger volume of fresh medium. The parent cells may be cultured in a bioreactor, such as, e.g., a Wave-type bioreactor, a stirred-tank bioreactor. Various configurations of bioreactors are known in the art and a suitable configuration may be chosen as desired. Configurations suitable for culturing and/or expanding populations of parent cells can easily be determined by one of skill in the art without undue experimentation. The bioreactor can be oxygenated. The bioreactor may optionally contain one or more impellers, a recycle stream, a media inlet stream, and control components to regulate the influx of media and nutrients or to regulate the outflux of media, nutrients, and waste products.

Sources of Synthetic Nanoparticles

Nanoparticles may be made synthetically or isolated from a biological system such as a cell or an organism. The nanoparticles may contain biological macromolecules such as lipids, proteins, nucleic acids and/or carbohydrates. Methods of making nanoparticles are well-known in the art. For example, nanoparticles such as liposomes, lipid nanoparticles, detergents, beads, and other polymeric structures, can be produced by extrusion, emulsion, sonication, mixing, self-assembly, lithography, or crystallization.

II.B. Enrichment of Extracellular Vesicle Preparations

With respect to purification or enrichment of extracellular vesicles, it is contemplated that all known manners of purification of extracellular vesicles are deemed suitable for use herein. For example, physical properties of extracellular vesicles may be employed to separate them from a medium or other source material, including separation on the basis of electrical charge (e.g., electrophoretic separation, ion-exchange chromatography), size (e.g., filtration, size-exclusion chromatography, molecular sieving, etc.), density (e.g., regular or gradient centrifugation), Svedberg constant (e.g., sedimentation with or without external force, etc.). For ion-exchange chromatography, any suitable methods known in the art may be used including, but not limited to, anion-exchange chromatography, and strong-anion exchange chromatography. For density gradient centrifugation, any appropriate density gradient medium used in the art may be used, including, but not limited to, sucrose density gradient medium and mediums comprising, iodixanol solution, colloidal silica, inorganic salts, polyhydric alcohols, polysaccharides, poly(vinyl alcohol), iohexol and nonionic iodinated media. Purification of the extracellular vesicles may be performed by manually loading columns or other devices, or may be automated using devices such an autosampler.

Alternatively, or additionally, isolation can be based on one or more biological properties, and include methods that can employ surface markers (e.g., precipitation, reversible binding to solid phase, FACS separation, separation using magnetic surfaces, specific ligand binding, immunoprecipitation or other antibody-mediated separation techniques, non-specific ligand binding such as annexin V, etc.). In yet further contemplated methods, the extracellular vesicles can also be fused using chemical and/or physical methods, including PEG-induced fusion and/or ultrasonic fusion.

In certain embodiments, enrichment of extracellular vesicles can be done in a general and non-selective manner (e.g., methods comprising serial centrifugation), and can be performed by aggregation where the extracellular vesicles are interlinked with an interlinking composition (e.g., annexin V, fibrin, or an antibody or fragment thereof against at least one of a tetraspanin, ICAM-1, CD86, CD63, PTG-FRN, BASP1, or any combination thereof). Non-limiting examples of the interlinking composition are found in U.S. Pat. No. 10,195,290 B1, issued Feb. 5, 2019 and US Publication No. 2019/0151456 A1 published May 23, 2019. Alternatively, enrichment of extracellular vesicles can be done in a more specific and selective manner (e.g., using tissue or cell specific surface markers). For example, specific surface markers can be used in immunoprecipitation, FACS sorting, and/or bead-bound ligands for magnetic separation, etc.

In some embodiments, size exclusion chromatography can be utilized to enrich the extracellular vesicles. Size exclusion chromatography techniques are known in the art. Exemplary, non-limiting techniques are provided herein. In some embodiments, a void volume fraction is isolated and comprises extracellular vesicles of interest. Further, in some embodiments, the extracellular vesicles can be further isolated after chromatographic separation by centrifugation techniques (of one or more chromatography fractions), as is generally known in the art. In some embodiments, for example, density gradient centrifugation can be utilized to further enrich the extracellular vesicles. Still further, in some embodiments, it can be desirable to further separate the parent-cell derived extracellular vesicles from extracellular vesicles of other origin. For example, the parent cell derived extracellular vesicles can be separated from non-parent cell-derived extracellular vesicles by immunosorbent capture using an antigen antibody specific for the parent cell. For example, anti-CD63 or anti-PTGFRN antibodies can be used.

In some embodiments, the isolation of extracellular vesicles can involve combinations of methods that include, but are not limited to, differential centrifugation, size-based membrane filtration, concentration and/or rate zonal centrifugation, and further characterized using methods that include, but are not limited to, electron microscopy, flow cytometry and/or Western blotting.

Extracellular vesicles can be extracted from the supernatant of parent cells and demonstrate membrane and internal protein, lipid, and nucleic acid compositions that enable their efficient delivery to and interaction with recipient cells. Extracellular vesicles can be derived from parent cells that may include, but are not limited to, reticulocytes, erythrocytes, megakaryocytes, platelets, neutrophils, tumor cells, connective tissue cells, neural cells and stem cells. Suitable sources of extracellular vesicles include but are not limited to, cells isolated from subjects from patient-derived hematopoietic or erythroid progenitor cells, immortalized cell lines, or cells derived from induced pluripotent stem cells, optionally cultured and differentiated. Cell culture protocols can vary according to compositions of nutrients, growth factors, starting cell lines, culture period, and morphological traits by which the resulting cells are characterized. In some embodiments, the samples comprising extracellular vesicles are derived from a plurality of donor cell types (e.g., 2, 3, 4, 5, 6, 7, 8, 9, 10, 50, 100, 500, 1000, 5000, or 10000 donor cell types) and are combined or pooled. Pooling may occur by mixing cell populations prior to extracellular vesicles extraction or by mixing isolated extracellular vesicles compositions from subsets of donor cell types. Parent cells may be irradiated or otherwise treated to affect the production rate and/or composition pattern of secreted extracellular vesicles prior to isolation.

In certain embodiments, the extracellular vesicles may be derived from cell lines that are differentiated, proliferated and cultured in-vitro. This enables controllable and reproducible compositions of extracellular vesicles that are not subject to constraints on isolation and purification of the requisite parent cell type.

In certain embodiments, the samples comprising the extracellular vesicles are obtained from raw cell harvest and the light scattering signature is determined. In certain embodiments, the raw cell harvest is clarified for larger cells and cellular debris prior to determination of the light scattering signature. In certain embodiments, the samples comprising the extracellular vesicles are further purified using any of the above mentioned methods for enrichment of the extracellular vesicles prior to determination of the light scattering signature of the samples.

In certain embodiments, the methods comprise fractionating the sample prior to determination of the light scattering signature. In certain embodiments, the method comprises the steps of loading the extracellular vesicle preparation on a size exclusion chromatography (SEC) column (e.g., a sepharose resin SEC column). In certain embodiments, the methods comprise the steps of loading the extracellular vesicle preparation on an ion exchange chromatography column. In certain embodiments, the methods comprise the steps of loading the extracellular vesicle preparation on a strong anion exchange chromatography column.

In some aspects, the present method can be used during the process of a chromatography, e.g., an anion exchange chromatography (AEX). AEX is one form of ion exchange chromatography that separates samples based on their surface charge. AEX uses positively charged ligands having affinity to targets having negative surface charges. AEX resin refers to a solid phase which is positively charged, e.g. having one or more positively charged ligands. In some aspects, the ligands are selected from diethylaminopropyl, diethylaminoethyl, quaternary aminoethyl, quaternary ammonium, carboxymethyl, carboxylic acid, glutamic acid, aspartic acid, histidine, hydroxyl, phosphate, tertiary amines, quaternary amines, diethaminoethyl, dimethylaminoethyl, trimethylaminoethyl, an amino acid ligand, or combinations thereof. Commercially available anion exchange resins include DEAE cellulose, QAE SEPHADEX and FAST Q SEPHAROSE (Pharmacia). In certain aspects, the chromatography ligands can be bound to a base matrix. In some aspects, the base matrix can comprise monoliths, hydrogels, porous devices, nanofibers, composite resins, beaded resins, beaded resin with inert porous shells, and/or any other solid or porous support. In some aspects, the base matrix can comprise cellulose, agarose, polystyrene derivatives, polyvinyl ether, silica, methacrylate derivatives, glass, ceramic hydroxyapatite, acrylamide, and/or other backbones commonly used in chromatography.

Examples of anion exchange resins include, but are not limited to: Q SEPHAROSE™ FF, Q SEPHAROSE™ HP. Q SEPHAROSE™ BB, Q SEPHAROSE™ XL, DEAE SEPHAROSE™ FF. ANX SEPHAROSE™ 4FF low sub, ANX SEPHAROSE™ 4FF high sub, SOURCE™ 15Q, SOURCE™ 30Q. CAPTO™ Q. CAPTO™ DEAE, or CAPTO™ Q ImpRes, available from GE Healthcare: FRACTOGEL® EMD DEAE (M), FRACTOGEL® EMD TMAE (M), FRACTOGEL® EMD TMAE (S), FRACTOGEL® EMD TMAE Hicap (M), FRACTOGEL®; EMD TMAE Medcap (M), ESHMUNO® Q or ESHMUNO® Q. available from Merck Millipore: TOYOPEARL® DEAE-650C. TOYOPEARL® DEAE-650M. TOYOPEARL® DEAE-650S. TOYOPEARL® SuperQ-650C, TOYOPEARL® SuperQ-650M, TOYOPEARL® SuperQ-650S, TOYOPEARL® QAE-550C, TOYOPEARL® GIGACAP® Q-650M, TOYOPEARL® Q-600C AR, TOYOPEARL® GIGACAP® DEAE-650M, TOYOPEARL® GIGACAP® Q-650S, TOYOPEARL® NH2-750F, TSKGEL® SuperQ-5PW (20 µm), or TSKGEL® SuperQ-5PW (30 µm), available from Tosoh Bioscience: MACRO-PREP® DEAE, MACRO-PREP® High Q, MACRO-PREP® 25 Q, UNOSPHERE™ Q or NUVIA™ Q, available from BioRad Laboratories: Q HYPERCEL™, DEAE Ceramic HYPERD® F, Q Ceramic HYPERD® 20, Q Ceramic HYPERD® F, or HYPERCEL™ STAR AX, available from Pall Corporation: POROS® 50 HQ, POROS® 50 PI, POROS® 50 D, POROS® 20 HQ, or POROS® XQ, available from Thermo Fisher Scientific/Life Technologies: DEAE PuraBead HF, available from Prometic Bioseparations: PL-SAX 1000 Å 30 µm, or PL-SAX 1000 Å 10 µm, available from Agilent Technologies: CELLUFINE® MAX Q-h, or CELLUFINE® Q-500 (m), available from JNC Corporation: BAKERBOND™ POLYQUAT, BAKERBOND™ POLYPEI, or BAKERBOND™ POLYPEI, available from Avantor Pharmaceutical Materials: YMC—BioPro Q30, YMC—BioPro Q75, YMC—BioPro SmartSep Q10, or YMC—BioPro SmartSep Q30, available from YMC: Sartobind Q, available from 8 mm; or PRAESTO™ Q65 or PRAESTO™ Q90, available from Purolite. In some aspectsthe AEX resin can be Sartobind Q, available from 8 mm. In some aspects, an AEX resin for the AEX process is SARTOBIND® Q (8 mm). In some aspects, the AEX is a strong anion exchange chromatography. In some aspects, the AEX can use PROPAC™ SAX-10 LC columns (ThermoFisher Scientific) or equivalents of.

AEX can comprise one or more loading steps, wash steps, and/or elution steps. In some aspects, the light scattering emission signal can be measured after each step, e.g., each elution step. Various AEX buffers (loading buffer, elution buffer, wash buffer, etc) and conditions can be used for the present methods. In other aspects, the loading buffer, the elution buffer, and the wash buffer are the same. In other aspects, the loading buffer, the elution buffer, and the wash buffer are different. In some aspects, the buffer can be 50 mM Tris at pH 7.4. In other aspects, the buffer is 50 mM Tris and 2.0 M NaCl at pH 7.4.

II.C. Detection of Light Scattering Emission Signal

In certain embodiments, the light scattering signature of the eluted fractions from columns used for separation and/or fractionation of the samples comprising the nanoparticles and/or extracellular vesicles are detected in a single step. In certain embodiments, the light scattering signature of the eluted fractions from the columns used for separation and/or fractionation is detected in multiple steps. In certain embodiments, the detection of the light scattering signature of the eluted fractions is detected after the fractions have been further processed or stored for a period of time. In certain embodiments, the eluted fractions are analyzed for a light scattering signature on the same device as the device used for separation and/or fractionation of the sample comprising the extracellular vesicles. In certain embodiments, the fractions are analyzed for a light scattering signature on a separate device as the device used for separation and/or fractionation of the sample comprising the nanoparticles and/or extracellular vesicles. In certain embodiments, the sample fractions are collected using a flow-cell. In some aspects, the light scattering signals are measured during one or more downstream purification processes.

The relative amounts or concentrations of nanoparticles and/or extracellular vesicles are determined or assessed by measurement of light scattering using standard techniques. In some aspects, the present disclosure is directed to a method of detecting nanoparticles in a sample, comprising: measuring a light scattering signal emitted from the nanoparticles in the sample ("emission signal") after the sample is excited with a light source. Detection and/or measurement of light scattering emission signal can be performed manually by multi-angle light scattering, dynamic light scattering, nanoparticle tracking assay, X-ray scattering, neutron scattering wide-angle X-ray scattering, small-angle X-ray scattering, ALPHALISAR, two-dimensional liquid chromatography, or any other method known in the art. Examples of the detectors for the light scattering emission signals are, but not limited to, UV/Vis detectors, dynamic and static light scattering detectors, evaporative light scattering detectors, photodiode array detector, fluorescence detector, UV detector, turnable UV detector, multi-channel fluorescence detector, dual wavelength absorbance detector, multichannel UV/Vis detector, and scanning fluorescence detector. In certain embodiments, light scattering emission signal of the nanoparticles and/or extracellular vesicle preparations or fractions of nanoparticle and/or extracellular vesicle preparations is determined or measured using a microplate reader or any other acceptable method known in the art for the detection and measurement of light scattering in a sample. In some aspects, the light scattering emission signal is not a fluorescence signal.

In certain embodiments, extracellular vesicle preparation can be sorted by flow cytometry, e.g., bead-based flow cytometry as described in Melo et al. (Nature, 2015 Jul. 9:523|7559]:177-82) based on light scattering methods at particular excitation and emission spectra.

In certain embodiments, the light scattering profile of nanoparticles is detected on a UV/Vis detector and/or a fluorescence detector by exciting at a range between 200 and 700 nm absorbance wavelength (i.e., excitation wavelength) and at a range between 0nm and 25 nm greater or less than the emission wavelength (e.g., 400 nm excitation, 410 nm or 390 nm emission, but not at 400 nm excitation, 430 nm or 370 nm emission). In certain embodiments, the light scattering profile of nanoparticles is detected on a fluorescence detector by exciting at a range between 280 nm and 700 nm excitation wavelength.

In certain aspects, a light scattering emission signal of the nanoparticles in a sample can be measured after the sample is excited with a light source. In some aspects, the light scattering emission signal is not fluorescence.

In some aspects, the light source has an excitation wavelength ranging from about 200 nm to about 900 nm. In some aspects, the light source has an excitation wavelength ranging from about 200 nm to about 900 nm, from about 200 nm to about 800 nm, from about 200 nm to about 700 nm, from about 210 nm to about 900 nm, from about 210 nm to about 800 nm, from about 210 nm to about 700 nm, from about 220 nm to about 900 nm, from about 220 nm to about 800 nm, from about 220 nm to about 700 nm, from about 230 nm to about 900 nm, from about 230 nm to about 800 nm, from about 230 nm to about 700 nm, from about 240 nm to about 900 nm, from about 240 nm to about 800 nm, from about 240 nm to about 700 nm, from about 250 nm to about 900 nm, from about 200 nm to about 800 nm, from about 250 nm to about 700 nm, from about 260 nm to about 900 nm, from about 260 nm to about 800 nm, from about 260 nm to about 700 nm, from about 270 nm to about 900 nm, from about 270 nm to about 800 nm, from about 270) nm to about 700 nm, from about 280 nm to about 900 nm, from about 280 nm to about 800 nm.

In some aspects, the light source has an excitation wavelength ranging from about 280 nm to about 700 nm. In some aspects, the light source has an excitation wavelength ranging from about 300 nm to about 700 nm, from about 320 nm to about 700 nm, from about 340 nm to about 700 nm, from about 360 nm to about 700 nm, from about 380 nm to about 700 nm, from about 400 nm to about 700 nm, from about 420 nm to about 700 nm, from about 440 nm to about 700 nm, from about 460 nm to about 700 nm, from about 300 nm to about 660 nm, from about 320 nm to about 660 nm, from about 340 nm to about 660 nm, from about 360 nm to about 660 nm, from about 380 nm to about 660 nm, from about 400 nm to about 660 nm, from about 420 nm to about 660 nm, from about 440 nm to about 660 nm, from about 460 nm to about 660 nm, from about 300 nm to about 640 nm, from about 320 nm to about 640 nm, from about 340) nm to about 640) nm, from about 360 nm to about 640 nm, from about 380 nm to about 640) nm, from about 400 nm to about 640) nm, from about 420) nm to about 640) nm, from about 440) nm to about 640) nm, from about 460) nm to about 640 nm, from about 400 nm to about 600 nm, from about 400 nm to about 500 nm, from about 450) nm to about 500 nm, from about 420 nm to about 520 nm, or from about 440 nm to about 540) nm.

In some aspects, the light source has an excitation wavelength ranging from about 400 nm to about 500 nm. In some aspects, the light source has an excitation wavelength ranging from about 400 nm to about 410 nm. In some aspects, the light source has an excitation wavelength ranging from about 410 nm to about 420 nm. In some aspects, the light source has an excitation wavelength ranging from about 420 nm to about 430 nm. In some aspects, the light source has an excitation wavelength ranging from about 430 nm to about 440 nm. In some aspects, the light source has an excitation wavelength ranging from about 440 nm to about 450 nm. In some aspects, the light source has an excitation wavelength ranging from about 450 nm to about 460 nm. In some aspects, the light source has an excitation wavelength ranging from about 460 nm to about 470 nm. In some aspects, the light source has an excitation wavelength ranging from about 470 nm to about 480 nm. In some aspects, the light source has an excitation wavelength ranging from about 480 nm to about 490 nm. In some aspects, the light source has an excitation wavelength ranging from about 490 nm to about 500 nm.

In some aspects, the light source has an excitation wavelength of about 400 nm. In some aspects, the light source has an excitation wavelength of about 400 nm, about 410 nm, about 420 nm, about 430 nm, about 440 nm, about 450) nm, about 460) nm, about 470) nm, about 480 nm, about 490 nm, or about 500 nm. In some aspects, the light source has an excitation wavelength of about 400 nm. In some aspects, the light source has an excitation wavelength of about 410 nm. In some aspects, the light source has an excitation wavelength of about 420 nm. In some aspects, the light source has an excitation wavelength of about 430) nm. In some aspects, the light source has an excitation wavelength of about 440 nm. In some aspects, the light source has an excitation wavelength of about 450 nm. In some aspects, the light source has an excitation wavelength of about 460 nm. In some aspects, the light source has an excitation wavelength of about 470 nm. In some aspects, the light source has an excitation wavelength of about 480 nm. In some aspects, the light source has an excitation wavelength of about 490 nm. In some aspects, the light source has an excitation wavelength of about 500 nm.

In some aspects, the light scattering emission signal has an emission wavelength equal to or longer than the excitation wavelength. In some aspects, the emission wavelength is less than about 20 nm, less than about 19 nm, less than about 18 nm, less than about 17 nm, less than about 16 nm, less than about 15 nm, less than about 14 nm, less than about 13 nm, less than about 12 nm, less than about 11 nm, less than about 10 nm, less than about 9 nm, less than about 8 nm, less than about 7 nm, less than about 6 nm, less than about 5 nm, less than about 4 nm, less than about 3 nm, less than about 2 nm, less than about 1 nm, or less than about 0.5 nm longer than the excitation wavelength.

In some aspects, the emission wavelength is about 0.1 nm to about 20 nm, about 0.5 nm to about 20 nm, about 0.5 nm to about 19 nm, about 0.5 nm to about 18 nm, about 0.5 nm to about 17 nm, about 0.5 nm to about 16 nm, about 0.5 nm to about 15 nm, about 0.5 nm to about 14 nm, about 0.5 nm to about 13 nm, about 0.5 nm to about 12 nm, about 0.5 nm to about 11 nm, about 0.5 nm to about 10 nm, about 0.5 nm to about 9 nm, about 1 nm to about 20 nm, about 1 nm to about 19 nm, about 1 nm to about 18 nm, about 1 nm to about 17 nm, about 1 nm to about 16 nm, about 1 nm to about 15 nm, about 1 nm to about 14 nm, about 1 nm to about 13 nm, about 1 nm to about 12 nm, about 1 nm to about 11 nm, about 1 nm to about 10 nm, about 1 nm to about 9 nm, about 2 nm to about 20 nm, about 2 nm to about 19 nm, about 2 nm to about 18 nm, about 2 nm to about 17 nm, about 2 nm to about 16 nm, about 2 nm to about 15 nm, about 2 nm to about 14 nm, about 2 nm to about 13 nm, about 2 nm to about 12 nm, about 2 nm to about 11 nm, about 2 nm to about 10 nm, about 2 nm to about 9 nm, about 3 nm to about 20 nm, about 3 nm to about 19 nm, about 3 nm to about 18 nm, about 3 nm to about 17 nm, about 3 nm to about 16 nm, about 3 nm to about 15 nm, about 3 nm to about 14 nm, about 3 nm to about 13 nm, about 3 nm to about 12 nm, about 3 nm to about 11 nm, about 3 nm to about 10 nm, about 3 nm to about 9 nm, about 4 nm to about 20 nm, about 4 nm to about 19 nm, about 4 nm to about 18 nm, about 4 nm to about 17 nm, about 4 nm to about 16 nm, about 4 nm to about 15 nm, about 4 nm to about 14 nm, about 4 nm to about 13 nm, about 4 nm to about 12 nm, about 4 nm to about 11 nm, about 4 nm to about 10 nm, about 4 nm to about 9 nm, about 5 nm to about 20 nm, about 5 nm to about 19 nm, about 5 nm to about 18 nm, about 5 nm to about 17 nm, about 5 nm to about 16 nm, about 5 nm to about 15 nm, about 5 nm to about 14 nm, about 5 nm to about 13 nm, about 5 nm to about 12 nm, about 5 nm to about 11 nm, about 5 nm to about 10 nm, about 5 nm to about 9 nm, about 6 nm to about 20 nm, about 6 nm to about 19 nm, about 6 nm to about 18 nm, about 6 nm to about 17 nm, about 6 nm to about 16 nm, about 6 nm to about 15 nm, about 6 nm to about 14 nm, about 6 nm to about 13 nm, about 6 nm to about 12 nm, about 6 nm to about 11 nm, about 6 nm to about 10 nm, about 6 nm to about 9 nm, about 7 nm to about 20 nm, about 7 nm to about 19 nm, about 7 nm to about 18 nm, about 7 nm to about 17 nm, about 7 nm to about 16 nm, about 7 nm to about 15 nm, about 7 nm to about 14 nm, about 7 nm to about 13 nm, about 7 nm to about 12 nm, about 7 nm to about 11 nm, about 7 nm to about 10 nm, about 7 nm to about 9 nm, about 8 nm to about 20 nm, about 8 nm to about 19 nm, about 8 nm to about 18 nm, about 8 nm to about 17 nm, about 8 nm to about 16 nm, about 8 nm to about 15 nm, about 8 nm to about 14 nm, about 8 nm to about 13 nm, about 8 nm to about 12 nm, about 8 nm to about 11 nm, about 8 nm to about 10 nm, about 8 nm to about 9 nm, about 9) nm to about 20 nm, about 9 nm to about 19 nm, about 9 nm to about 18 nm, about 9 nm to about 17 nm, about 9 nm to about 16 nm, about 9 nm to about 15 nm, about 9) nm to about 14 nm, about 9) nm to about 13 nm, about 9 nm to about 12 nm, about 9) nm to about 11 nm, about 9 nm to about 10 nm, about 10 nm to about 20 nm, about 10) nm to about 19 nm, about 10 nm to about 18 nm, about 10 nm to about 17 nm, about 10 nm to about 16 nm, about 10 nm to about 15 nm, about 10 nm to about 14 nm, about 10) nm to about 13 nm, about 10 nm to about 12 nm, or about 10 nm to about 11 nm longer than the excitation wavelength.

In some aspects, the difference between the emission and excitation wavelengths ranges from about 5 nm to about 20 nm. In some aspects, the difference between the emission and excitation wavelengths ranges from about 10 nm to about 20 nm.

In some aspects, the difference between the emission and excitation wavelengths ranges from about 0 nm to about 1 nm, about 0 nm to about 2 nm, about 0 nm to about 3 nm, about 0 nm to about 4 nm, about 0 nm to about 5 nm, about 0 nm to about 6 nm, about 0 nm to about 7 nm, about 0 nm to about 8 nm, about 0 nm to about 9 nm, or about 0 nm to about 10 nm. In some aspects, the difference between the emission and excitation wavelengths ranges from about 1 nm to about 2 nm, about 1 nm to about 3 nm, about 1 nm to about 4 nm, about 1 nm to about 5 nm, about 1 nm to about 6 nm, about 1 nm to about 7 nm, about 1 nm to about 8 nm, about 1 nm to about 9 nm, or about 1 nm to about 10 nm. In some aspects, the difference between the emission and excitation wavelengths ranges from about 2 nm to about 3 nm, about 2 nm to about 4 nm, about 2 nm to about 5 nm, about 2 nm to about 6 nm, about 2 nm to about 7 nm, about 2 nm to about 8 nm, about 2 nm to about 9 nm, about 2 nm to about 10 nm, about 3 nm to about 4 nm, about 3 nm to about 5 nm, about 3 nm to about 6 nm, about 3 nm to about 7 nm, about 3 nm to about 8 nm, about 3 nm to about 9 nm, about 3 nm to about 10 nm, about 4 nm to about 5 nm, about 4 nm to about 6 nm, about 4 nm to about 7 nm, about 4 nm to about 8 nm, about 4 nm to about 9 nm, about 4 nm to about 10 nm, about 5 nm to about 6 nm, about 5 nm to about 7 nm, about 5 nm to about 8 nm, about 5 nm to about 9 nm, about 5 nm to about 10 nm, about 6 nm to about 7 nm, about 6 nm to about 8 nm, about 6 nm to about 9 nm, about 6 nm to about 10 nm, about 7 nm to about 8 nm, about 7 nm to about 9 nm, about 7 nm to about 10 nm, about 8 nm to about 9 nm, about 8 nm to about 10 nm, or about 9 nm to about 10 nm, In some aspects, the difference between the emission and excitation wavelengths is selected from a group comprising 0, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, and 20 nm.

In some aspects, the light source has an excitation wavelength at about 300 nm, about 310 nm, about 320 nm, about 330 nm, about 340 nm, about 350 nm, about 360 nm, about 370 nm, about 380 nm, about 390 nm, about 400 nm, about 410 nm, about 420 nm, about 430 nm, about 440 nm, about 450 nm, about 460 nm, about 470 nm, about 480 nm, about 490 nm, about 500 nm, about 510 nm, about 520 nm, about 530 nm, about 540 nm, about 550 nm, about 560 nm, about 570 nm, about 580 nm, about 590 nm, about 600 nm, about 610 nm, about 620 nm, about 630 nm, about 640 nm, about 650 nm, about 660 nm, about 670 nm, about 680 nm, about 690 nm, or about 700 nm. In some aspects, the light scattering emission wavelength is between 300 nm and about 320 nm, between 310 nm and about 330 nm, between 320 nm and about 340 nm, between 330 nm and about 350 nm, between 340 nm and about 360 nm, between 350 nm and about 370 nm, between 360 nm and about 380 nm, between 370 nm and about 390 nm, between 380 nm and about 400 nm, between 390 nm and about 410 nm, between 400 nm and about 420 nm, between 410 nm and about 430 nm, between 420 nm and about 440 nm, between 430 nm and about 450 nm, between 440 nm and about 460 nm, between 450 nm and about 470 nm, between 460 nm and about 480 nm, between 470 nm and about 490 nm, between 480 nm and about 500 nm, between 490 nm and about 510 nm, between 500 nm and about 520 nm, between 510 nm and about 530 nm, between 520 nm and about 540 nm, between 530 nm and about 550 nm, between 540 nm and about 560 nm, between 550 nm and about 570 nm, between 560 nm and about 580 nm, between 570 nm and about 590 nm, between 580 nm and about 600 nm, between 590 nm and about 610 nm, between 600 nm and about 620 nm, between 610 nm and about 630 nm, between 620 nm and about 640 nm, between 630 nm and about 650 nm, between 640 nm and about 660 nm, between 650 nm and about 670 nm, between 660 nm and about 680 nm, between 670 nm and about 690 nm, between 680 nm and about 700 nm, between 690 nm and about 710 nm, or between 700 nm and about 720 nm, respectively.

In an aspect, the light scattering emission signal is determined or detected at an emission wavelength range of 0nm and 18 nm greater than or less than the excitation wavelength.

In an aspect, the light scattering profile of nanoparticles is detected at 460 nm excitation and 470 nm emission. In an aspect, the light scattering profile of nanoparticles is detected at 460 nm excitation and 460 nm emission.

In some aspects, the light source has an excitation wavelength at about 450 nm to about 470 nm. In some aspects, the excitation wavelength is about 460 nm and the emission wavelength is about 460 nm to about 480 nm. In some aspects, the excitation wavelength is about 460 nm and the emission wavelength is about 460 nm, about 465 nm, about 470 nm, about 475 nm, or about 480 nm.

In some aspects, the excitation wavelength is about 450 nm and the emission wavelength is about 450 nm to about 470 nm. In some aspects, the excitation wavelength is about 450 nm and the emission wavelength is about 450 nm, about 455 nm, about 460 nm, about 465 nm, or about 470 nm. In some aspects, the excitation wavelength is about 470 nm and the emission wavelength is about 470 nm to about 490 nm.

In some aspects, the excitation wavelength is about 470 nm and the emission wavelength is about 470 nm, about 475 nm, about 480 nm, about 485 nm, or about 490 nm.

In some aspects, the excitation wavelength is about 550 nm to about 560 nm and the emission wavelength is about 550 nm to about 580 nm and wherein the excitation wavelength is the same or shorter than the emission wavelength.

In some aspects, the excitation wavelength is about 556 nm and the emission wavelength is about 556 nm, about 560 nm, about 565 nm, about 570 nm, or about 573 nm.

In some aspects, the method comprises detecting nanoparticles in a sample, comprising: measuring a light scattering signal emitted from the nanoparticles in the sample ("emission signal") at about 470 nm after the sample is excited with a light source at about 460 nm. In some aspects, the method comprises detecting nanoparticles in a sample, comprising: measuring a light scattering signal emitted from the nanoparticles in the sample ("emission signal") at a wavelength between about 450 nm and about 490 nm after the sample is excited with a light source at a wavelength between about 450 nm and 470 nm: (i) 450 nm excitation and 450 nm to 470 nm emission wavelength: (ii) 455 nm excitation and 455 nm to 475 nm emission wavelength: (iii) 460 nm excitation and 460 nm to 480 nm emission wavelength: (iv) 465 nm excitation and 465 nm to 485 nm emission wavelength: or (v) 470 nm excitation and 470 nm to 490 nm emission wavelength.

In some aspects, the light scattering emission signal is measured by a UV/Vis detector or a fluorescence detector.

In some embodiments, the excitation and emission wavelengths are selected so that the excitation wavelength is shorter than or equal to the emission wavelength. In some embodiments, the excitation and emission wavelengths are selected so that the excitation wavelength is longer than or equal to the emission wavelength.

In certain aspects, the absorbance wavelength (i.e., excitation wavelength) varies according to the membrane composition and/or payload composition of the extracellular vesicle. In certain aspects, the emission wavelength varies according to the membrane composition and/or payload composition of the extracellular vesicle. In certain aspects, the emission wavelength and/or absorbance wavelength (i.e., excitation wavelength) varies according to the homogeneity of the extracellular vesicle preparation. In certain aspects, the absorbance wavelength (i.e., excitation wavelength) and/or emission wavelength used to detect the extracellular vesicle varies according to the type of producer cell from which the extracellular vesicle is derived. In certain aspects, the absorbance wavelength (i.e., excitation wavelength) and/or emission wavelength used to detect the extracellular vesicle varies according to the purity of the extracellular preparation prior to detection of the extracellular vesicles.

In some aspects, the light scattering emission signal detected at a given wavelength, e.g., 460 nm to 480 nm when excited at 460 nm, indicates the purity of extracellular vesicles, e.g., exosomes, in the sample. In some aspects, the light scattering emission signal detected at certain wavelengths, e.g., outside of 460 nm to 480 nm when excited at 460 nm indicates the presence of contaminants in the sample. In some aspects, the light scattering emission signal indicates the concentration of the nanoparticles in the sample. In some aspects, the light scattering emission signal indicates the concentration of contaminants in the sample.

In some aspects, the light scattering emission signal is measured during one or more batch release assays. In some aspects, one of the batch release assays is a size exclusion chromatography (SEC). In some aspects, the SEC comprises one or more elution steps. In some aspects, the nanoparticles are eluted in at least one of the elution steps.

II.D. Detection of Intrinsic Fluorescence Signal

In some aspects, the method further comprises measuring intrinsic fluorescence of the nanoparticles in the sample in addition to the light scattering emission signal as described herein. In some aspects, the intrinsic fluorescence is measured by a fluorescence detector after the nanoparticles of the sample are excited at an excitation wavelength of about 280 nm. Intrinsic fluorescence can measure proteins embedded in extracellular vesicles, proteins fused to the surface of the extracellular vesicles, or protein contaminants in the mixture with the extracellular vesicles. In other aspects, intrinsic fluorescence of nanoparticles in a sample can be obtained as a result of the fluorescent emission of one or more amino acids, e.g., aromatic amino acids. In some aspects, intrinsic protein fluorescence is due to the fluorescent emission of tryptophan when excited with 280 nm. In some aspects, intrinsic protein fluorescence is due to the fluorescent emission of other aromatic amino acids, examples including, but not limited to, tyrosine (excitation wavelength at 274 nm; intrinsic fluorescence emission wavelength at 303 nm) and phenyl alanine (excitation wavelength at 257 nm; intrinsic fluorescence emission wavelength at 282 nm). In some aspects, the intrinsic fluorescence, e.g., of tryptophan, is measured by a fluorescence detector after the nanoparticles of the sample are excited at an excitation wavelength of about 280 nm to about 700 nm. In some aspects, the excitation wavelength is about 280 nm.

In some aspects, the intrinsic fluorescence, e.g., of tryptophan, is emitted at a wavelength of 350 nm. In some aspects, the intrinsic fluorescence, e.g., of tryptophan, is emitted at a wavelength of about 300 nm, about 350 nm, about 400 nm, about 450 nm, about 500 nm, about 550 nm, about 600 nm, about 650 nm, or about 700 nm.

In some aspects, the intrinsic fluorescence, e.g., of tryptophan, is emitted at a wavelength of about 300 nm, about 350 nm, about 400 nm, about 450 nm, about 500 nm, about 550 nm, about 600 nm, about 650 nm, or about 700 nm. In some aspects, the excitation wavelength is about 280 nm, and the intrinsic fluorescence, e.g., of tryptophan, is emitted at a wavelength of about 350 nm.

In some aspects, the intrinsic fluorescence, e.g., of tyrosine, is measured by a fluorescence detector after the nanoparticles of the sample are excited at an excitation wavelength of about 270 nm to about 280 nm. In some aspects, the excitation wavelength is about 270 nm, about 274 nm, about 275 nm, about 278 nm, or about 280 nm.

In some aspects, the intrinsic fluorescence, e.g., of tyrosine, is emitted at a wavelength of 303 nm. In some aspects, the intrinsic fluorescence, e.g., of tyrosine, is emitted at a wavelength of about 290 nm, about 295 nm, about 300 nm, about 305 nm, about 310 nm, about 315 nm, about 320 nm, or about 330 nm.

In some aspects, the excitation wavelength is about 274 nm, and the intrinsic fluorescence, e.g., of tyrosine, is emitted at a wavelength of about 303 nm.

In some aspects, the intrinsic fluorescence, e.g., of phenyl alanine, is measured by a fluorescence detector after the nanoparticles of the sample are excited at an excitation wavelength of about 250 nm to about 270 nm, e.g., about 257 nm. In some aspects, the excitation wavelength is about 250 nm, about 255 nm, about 260 nm, about 265 nm, or about 270 nm.

In some aspects, the intrinsic fluorescence, e.g., of phenyl alanine, is emitted at a wavelength of 282 nm. In some aspects, the intrinsic fluorescence, e.g., of phenyl alanine, is emitted at a wavelength of about 270 nm, about 275 nm, about 280 nm, about 285 nm, about 290 nm, about 295 nm, about 300 nm, or about 305 nm.

In some aspects, the excitation wavelength is about 257 nm, and the intrinsic fluorescence, e.g., of phenyl alanine, is emitted at a wavelength of about 282 nm.

In some aspects, the intrinsic fluorescence signal is measured during one or more batch release assays. In some aspects, one of the batch release assays is a size exclusion chromatography (SEC). In some aspects, the SEC comprises one or more elution steps. In some aspects, the nanoparticles are eluted in at least one of the elution steps.

In some aspects, the intrinsic fluorescence is measured prior to the light scattering signal. In some aspects, the intrinsic fluorescence is measured after the light scattering signal.

II.E. Detection of UV Absorption

In some aspects, the method further comprises measuring a UV absorbance of the nanoparticles in the sample. The UV region falls in the range between 190-380 nm. In some aspects, the UV absorbance is measured by scanning the wavelength range from about 190 to about 380 nm. Proteins in solution absorb ultraviolet light with absorbance maxima at 280 and 200 nm. Amino acids with aromatic rings are the primary reason for the absorbance peak at 280 nm. Peptide bonds are primarily responsible for the peak at 200 nm. Secondary, tertiary, and quaternary structure all affect absorbance, therefore factors such as pH, ionic strength, etc. can alter the absorbance spectrum. In some aspects, the UV absorbance is measured at 280 nm after the sample is excited by a UV light at the wavelength of 280 nm. In some aspects, the UV absorbance is measured at 200 nm after the sample is excited by a UV light at the wavelength of 200 nm. In some aspects, the UV absorbance is measured by a UV/Vis detector.

II.F. Quantitation of Concentration of Extracellular Vesicle Preparations

In certain aspects, the methods comprise displaying the absorbance and/or emission spectra obtained from the sample on a chromatogram. In certain aspects, the relative amounts or concentrations of nanoparticles in the sample or a fraction of the sample is obtained by calculating the area under the resulting absorbance curve of the chromatogram and calculating the same using a quantification standard, wherein the standard is applied to a similar extracellular vesicle preparation. The concentration of the nanoparticles in the quantification standard can be measured by any of the known methods in the art and, in certain embodiments, can be independently verified by more than one technique, such as, but not limited to, electron microscopy, flow cytometry analysis of nanoparticles harboring exogenous fluorescent molecules, nanoparticle tracking analysis, resistive pulse sensing, and determination of total protein concentrations.

In certain aspects, the methods comprise determining the relative amounts of nanoparticles in a sample by measuring a luminescence signal. This signal can be used to directly measure the amounts of nanoparticles, or can be used as a standard based on the methods described herein used to measure the scattering signal of nanoparticle samples. In an aspect, the luminescence signal is a luminescence proximity assay, which relies on the generation of excited ambient oxygen species to induce chemiluminescence in a nearby acceptor fluorophore. In certain aspects, the luminescence assay comprises antibodies that bind to exosomes-associate proteins such as CD9, CD63, CD81, PTGFRN, and combinations thereof. In certain aspects, the luminescence assay is an ALPHASCREEN™ assay.

II.G. Further assessments and characterizations of Extracellular Vesicle Preparations The identity and concentration of the nanoparticles (e.g., extracellular vesicles) in a preparation or fraction and/or the quantification standard sample can be assessed and/or validated by in vitro assays. For example, the identity and concentration of the nanoparticles (e.g., extracellular vesicles) is determined or assessed by counting the number of complexes in a population, e.g., by microscopy, by flow cytometry, or by hemacytometry.

Alternatively, or in addition, the identity and/or concentration of the nanoparticles (e.g., extracellular vesicles) is assessed by analysis of protein content of the complex, e.g., by flow cytometry, Western blot, immunoprecipitation, fluorescence spectroscopy, chemiluminescence, mass spectrometry, or absorbance spectroscopy. In an embodiment, the protein content assayed is a non-surface protein, e.g., an integral membrane protein, hemoglobin, adult hemoglobin, fetal hemoglobin, embryonic hemoglobin, or a cytoskeletal protein. In an embodiment, the protein content assayed is a surface protein, e.g., a differentiation marker, a receptor, a co-receptor, a transporter, a glycoprotein. In an embodiment, the surface protein is selected from the list including, but not limited to, glycophorin A, CKIT, transferrin receptor, Band3, Kell, CD45, CD46, CD47, CD55, CD59, CRI, CD9, CD63 and CD81. In an embodiment, the identity of nanoparticles (e.g., extracellular vesicles) is assessed by analysis of the receiver content of the vesicle, e.g., by flow cytometry, Western blot, immunoprecipitation, fluorescence spectroscopy, chemiluminescence, mass spectrometry, or absorbance spectroscopy. For example, the identity of extracellular vesicles can be assessed by the mRNA and/or miRNA content of the complexes, e.g., by RT-PCR, flow cytometry, or northern blot. The identity of the extracellular vesicles can be assessed by nuclear material content, e.g., by flow cytometry, microscopy, or southern blot, using, e.g., a nuclear stain or a nucleic acid probe. Alternatively, or in addition, the identity of the extracellular vesicles is assessed by lipid content of the complexes, e.g., by flow cytometry, liquid chromatography, or by mass spectrometry.

In some embodiments, the identity of the nanoparticles (e.g., extracellular vesicles) is assessed by metabolic activity of the complexes, e.g., by mass spectrometry, chemiluminescence, fluorescence spectroscopy, absorbance spectroscopy. Metabolic activity can be assessed by ATP consumption rate and/or the metabolic activity is assessed measuring 2,3-diphosphoglycerate (2,3-DPG) level in the parent cells or extracellular vesicles. The metabolic activity can be assessed as the rate of metabolism of one of the following, including but not limited to, acetylsalicylic acid, n-acetylcystein, 4-aminophenol, azathioprine, bunolol, captopril, chlorpromazine, dapsone, daunorubicin, dehydroepiandrosterone, didanosin, dopamine, epinephrine, esmolol, estradiol, estrone, etoposide, haloperidol, heroin, insulin, isoproterenol, isosorbide dinitrate, ly 217896, 6-mercaptopurine, misonidazole, nitroglycerin, norepinephrine, para-aminobenzoic acid. In some embodiments, the identity of the extracellular vesicles is assessed by partitioning of a substrate by the complexes, e.g., by mass spectrometry, chemiluminescence, fluorescence spectroscopy, or absorbance spectroscopy. The substrate can be one of the following, including but not limited to, acetazolamide, arbutine, bumetamide, creatinine, darstine, desethyldorzolamide, digoxigenin digitoxoside, digoxin-16'-glucuronide, epinephrine, gentamycin, hippuric acid, metformin, norepinephrine, p-aminohippuric acid, papaverine, penicillin g, phenol red, serotonin, sulfosalicylic acid, tacrolimus, tetracycline, tucaresol, and vancomycin.

In some embodiments, the nanoparticles (e.g., extracellular vesicles) are assessed for their basic physical properties, e.g., size, mass, volume, diameter, buoyancy, density, and membrane properties, e.g., viscosity, deformability fluctuation, and fluidity. In an embodiment, the diameter of the nanoparticles (e.g., extracellular vesicles) is measured by microscopy or by automated instrumentation, e.g., a hematological analysis instrument or by resistive pulse sensing. In some embodiments, the nanoparticle (e.g., extracellular vesicle) has a longest dimension between about 20-300 nm, such as between about 20-290 nm, 20-280 nm, 20-270 nm, 20-260 nm, 20-250 nm, 20-240 nm, 20-230 nm, 20-220 nm, 20-210 nm, 20-200 nm, 20-190 nm, 20-180 nm, 20-170 nm, 20-160 nm, 20-150 nm, 20-140 nm, 20-130 nm, 20-120 nm, 20-110 nm, 20-100 nm, 20-90 nm, 20-80 nm, 20-70 nm, 20-60 nm, 20-50 nm, 20-40 nm, 20-30 nm, 30-300 nm, 30-290 nm, 30-280 nm, 30-270 nm, 30-260 nm, 30-250 nm, 30-240 nm, 30-230 nm, 30-220 nm, 30-210 nm, 30-200 nm, 30-190 nm, 30-180 nm, 30-170 nm, 30-160 nm, 30-150 nm, 30-140 nm, 30-130 nm, 30-120 nm, 30-110 nm, 30-100 nm, 30-90 nm, 30-80 nm, 30-70 nm, 30-60 nm, 30-50 nm, 30-40 nm, 40-300 nm, 40-290 nm, 40-280 nm, 40-270 nm, 40-260 nm, 40-250 nm, 40-240 nm, 40-230 nm, 40-220 nm, 40-210 nm, 40-200 nm, 40-190 nm, 40-180 nm, 40-170 nm, 40-160 nm, 40-150 nm, 40-140 nm, 40-130 nm, 40-120 nm, 40-110 nm, 40-100 nm, 40-90 nm, 40-80 nm, 40-70 nm, 40-60 nm, 40-50 nm, 50-300 nm, 50-290 nm, 50-280 nm, 50-270 nm, 50-260 nm, 50-250 nm, 50-240 nm, 50-230 nm, 50-220 nm, 50-210 nm, 50-200 nm, 50-190 nm, 50-180 nm, 50-170 nm, 50-160 nm, 50-150 nm, 50-140 nm, 50-130 nm, 50-120 nm, 50-110 nm, 50-100 nm, 50-90 nm, 50-80 nm, 50-70 nm, 50-60 nm, 60-300 nm, 60-290 nm, 60-280 nm, 60-270 nm, 60-260 nm, 60-250 nm, 60-240 nm, 60-230 nm, 60-220 nm, 60-210 nm, 60-200 nm, 60-190 nm, 60-180 nm, 60-170 nm, 60-160 nm, 60-150 nm, 60-140 nm, 60-130 nm, 60-120 nm, 60-110 nm, 60-100 nm, 60-90 nm, 60-80 nm, 60-70 nm, 70-300 nm, 70-290 nm, 70-280 nm, 70-270 nm, 70-260 nm, 70-250 nm, 70-240 nm, 70-230 nm, 70-220 nm, 70-210 nm, 70-200 nm, 70-190 nm, 70-180 nm, 70-170 nm, 70-160 nm, 70-150 nm, 70-140 nm, 70-130 nm, 70-120 nm, 70-110 nm, 70-100 nm. 70-90 nm, 70-80 nm, 80-300 nm, 80-290 nm, 80-280 nm, 80-270 nm, 80-260 nm, 80-250 nm, 80-240 nm, 80-230 nm, 80-220 nm, 80-210 nm, 80-200 nm, 80-190 nm, 80-180 nm, 80-170 nm, 80-160 nm, 80-150 nm, 80-140 nm, 80-130 nm, 80-120 nm, 80-110 nm, 80-100 nm, 80-90 nm, 90-300 nm, 90-290 nm, 90-280 nm, 90-270 nm, 90-260 nm, 90-250 nm, 90-240 nm, 90-230 nm, 90-220 nm, 90-210 nm, 90-200 nm, 90-190 nm, 90-180 nm, 90-170 nm, 90-160 nm, 90-150 nm, 90-140 nm, 90-130 nm, 90-120 nm, 90-110 nm, 90-100 nm, 100-300 nm, 110-290 nm, 120-280 nm, 130-270 nm, 140-260 nm, 150-250 nm, 160-240 nm, 170-230 nm, 180-220 nm, or 190-210 nm.

In particularly preferred embodiments, the nanoparticle (e.g., extracellular vesicle) described herein has a longest dimension between about 30-100 nm. In another preferred embodiment, the nanoparticle (e.g., extracellular vesicle) has a longest dimension between about 20-300 nm. In another preferred embodiment, the nanoparticle (e.g., extracellular vesicle) has a longest dimension between about 40-200 nm. In another embodiment, a population of the nanoparticles (e.g., extracellular vesicles) described herein comprise a population wherein 90% of said nanoparticles (e.g., extracellular vesicles) have a longest dimension 20-300 nm. In another embodiment, a population of the nanoparticles (e.g., extracellular vesicles) described herein comprise a population wherein 95% of said nanoparticles (e.g., extracellular vesicles) have a longest dimension 20-300 nm. In another embodiment, a population of the nanoparticles (e.g., extracellular vesicles) described herein comprise a population wherein 99% of said nanoparticles (e.g., extracellular vesicles) have a longest dimension 20-300 nm. In another embodiment, a population of the nanoparticles (e.g., extracellular vesicles) described herein comprise a population wherein 90% of said nanoparticles (e.g., extracellular vesicles) have a longest dimension 40-200 nm. In another embodiment, a population of the nanoparticles (e.g., extracellular vesicles) described herein comprise a population wherein 95% of said nanoparticles (e.g., extracellular vesicles) have a longest dimension 40-200 nm. In another embodiment, a population of the nanoparticles (e.g., extracellular vesicles) described herein comprise a population wherein 99% of said nanoparticles (e.g., extracellular vesicles) have a longest dimension 40-200 nm. In other preferred embodiments, the size of the nanoparticles (e.g., extracellular vesicles) or population of nanoparticles (e.g., extracellular vesicles) described herein is measured according to methods described, infra.

In an embodiment, the average buoyant mass of the nanoparticles (e.g., extracellular vesicles) (pg/cell) is measured using a suspended microchannel resonator or a double suspended microchannel resonator (see e.g., Byun et al PNAS 2013 110(19):7580 and Bryan et al. Lab Chip 2014 14(3):569). In an embodiment, the dry density of the nanoparticles (e.g., extracellular vesicles) is measured by buoyant mass in an H2O-D2O exchange assay (see e.g., Feijo Delgado et al., PLOS One 2013 8(7):e67590). In some embodiments, the nanoparticles (e.g., extracellular vesicles) have an average membrane deformability fluctuation of standard deviation greater than 10, 20, 30, 40, 50, 60, 70, 80, 90, 100 or greater than 100 mrad as measured by spatial light interference microscopy (SLIM) (see e.g., Bhaduri et al., Sci Reports 2014, 4:6211). In an embodiment, the average membrane viscosity of a population of nanoparticles (e.g., extracellular vesicles) is measured by detecting the average fluorescence upon incubation with viscosity-dependent quantum yield fluorophores (see e.g., Haidekker et al. Chem & Biol 2001 8(2): 123). In an embodiment, the membrane fluidity of the nanoparticles (e.g., extracellular vesicles) is measured by fluorescence polarization, e.g., with BMG Labtech POLARSTAR® Omega microplate reader.

II.H. GMP Biologic Drug Lot or Batch Release Assays

In some aspects, the methods described herein can be used in the lot or batch release assays that are subjected to Food and Drug Agency (FDA) guidelines, Good Manufacturing Practice (GMP) for biologic drug or to GMP for Medicinal Products for Human and Veterinary Use.

Lot release is a mechanism that provides FDA with a real-time system to continuously monitor product quality, through review and testing, of many of the biological products that it regulates. Biological products licensed under the Public Health Service Act are subject to the lot release requirements of Subpart A of 21 C.F.R. Part 610 (General Biological Products Standards).

In some aspects, the process of release assays can comprise: 1) the checking of the manufacture and testing of the batch in accordance with defined release assays: 2) the certification of the finished product batch performed by a Qualified Person (QP) signifying that the batch of product is in compliance with GMP, which represents the quality release of the batch; and 3) the transfer to saleable stock, and/or export of the finished batch of product which should take into account the certification performed by the QP. The purpose of testing and controlling batch release is to ensure that the batch has been manufactured and checked in accordance with the principles and guidelines of GMP, and the relevant records are readily identifiable for future inspection. In some aspects, the release assays can also provide the deviation measurements for the manufacturing process and/or the analytical control methods. The deviation can be assessed in accordance with a quality risk management process using an appropriate approach under the GMP guidelines.

There are numerous generic and specific analyses that can be used to demonstrate that the product has been made according to GMP. In some aspects, the release assays require analysis of the physical characteristics of batch samples (for exosomes, this could be their color, fluidity, etc.) along with a host of tests on the active ingredients to ensure that their concentrations (and any degradation products) are within regulatory tolerance. In some aspects, the physical characteristics of extracellular vesicles (EVs) and nanoparticles manufactured can be measured during one or more release assays. In some aspects, the light scattering at various excitation and emission wavelengths, the intrinsic fluorescence, and the UV absorbance of the EVs and nanoparticles in the batch are measured and recorded to the sizes, purity, and concentration of the EVs and nanoparticles in the production. In some aspects, the light scattering signal is measured at the excitation wavelength of 460 nm and the emission wavelength at 470 nm. In some aspects, the intrinsic fluorescence is measured at the excitation wavelength of 280 nm and the emission wavelength at 350 nm. In some aspects, the UV absorbance is measured at the wavelength of 280 nm. The analyses and certification of the records are subject to the GMP regulation and guidelines. In some aspects, other measurements to assess the identity and concentration of the nanoparticles (e.g., extracellular vesicles) described herein can be included in the release assays.

This application claims the benefit to U.S. provisional application No. 62/688,304, filed Jun. 21, 2018, which is incorporated herein by reference in its entirety.

EXAMPLES

Below are examples of specific embodiments for carrying out the present disclosure. The examples are offered for illustrative purposes only, and are not intended to limit the scope of the present disclosure in any way. Efforts have been made to ensure accuracy with respect to numbers used (e.g., amounts, temperatures, etc.), but some experimental error and deviation should, of course, be allowed for.

The practice of the present disclosure will employ, unless otherwise indicated, conventional methods of protein chemistry, biochemistry, recombinant DNA techniques and pharmacology, within the skill of the art. Such techniques are explained fully in the literature. See, e.g., T. E. Creighton, *Proteins: Structures and Molecular Properties* (W. H. Freeman and Company, 1993): A. L. Lehninger, *Biochemistry* (Worth Publishers, Inc., current addition); Sambrook, et al., *Molecular Cloning: A Laboratory Manual* (2nd Edition, 1989); *Methods In Enzymology* (S. Colowick and N. Kaplan eds., Academic Press, Inc.); *Remington's Pharmaceutical Sciences*, 18th Edition (Easton, Pennsylvania: Mack Publishing Company, 1990); Carey and Sundberg *Advanced Organic Chemistry* 3rd Ed. (Plenum Press) Vols A and B(1992).

MethodsExosome Purification

Conditioned culture media is collected and centrifuged at 300-800× g for 5 minutes at room temperature to remove cells and large debris. Media supernatant is then supplemented with 1000 U/L benzonase and incubated at 37° ° C. for 1 hour in a water bath. Supernatant is collected and centrifuged at 16,000×g for 30 minutes at 4° C. to remove residual cell debris and other large contaminants. Supernatant is then ultracentrifuged at 133,900×g for 3 hours at 4° C. to pellet the exosomes. Supernatant is discarded and any residual media is aspirated from the bottom of the tube. The pellet is resuspended in 200-1000 μL PBS (—Ca —Mg).

To further enrich exosome populations, the pellet is processed via density gradient purification (sucrose or OPTIPREP™). For sucrose gradient purification, the exosome pellet is layered on top of a sucrose gradient as defined in Table 1 below:

TABLE 1

| Working Percentage (%) | 65% Stock Vol. (mL) | Milli-Q Vol. (mL) |
|---|---|---|
| 50 | 3.85 | 1.15 |
| 40 | 3.08 | 1.92 |
| 25 | 1.92 | 3.08 |
| 10 | 0.46 | 2.54 |

The gradient is spun at 200,000×g for 16 hours at 4° C. in a 12 mL ULTRA-CLEAR™ (344059) tube placed in a SW 41 Ti rotor to separate the exosome fraction.

The exosome layer is gently removed from the top layer and diluted in ~32.5 mL PBS in a 38.5 mL ULTRA-CLEAR™ (344058) tube and ultracentrifuged again at 133, 900×g for 3 hours at 4° C. to pellet the purified exosomes. The resulting pellet is resuspended in a minimal volume of PBS (~200 μL) and stored at 4° C.

For OPTIPREP™ gradient, a 3-tier sterile gradient is prepared with equal volumes of 10%, 30%, and 45% OPTIPREP™ in a 12 mL ULTRA-CLEAR™ (344059) tube for a SW 41 Ti rotor. The pellet is added to the OPTIPREP™ gradient and ultracentrifuged at 200,000×g for 16 hours at 4° ° C. to separate the exosome fraction. The exosome layer is then gently collected from the top ~3 mL of the tube.

The exosome fraction is diluted in ~32 mL PBS in a 38.5 mL ULTRA-CLEAR™ (344058) tube and ultracentrifuged at 133,900×g for 3 hours at 4° C. to pellet the purified exosomes. The pelleted exosomes are then resuspended in a minimal volume of PBS (~200 μL) and store at 4° C.

For ALPHASCREEN™ assays, unconjugated acceptor beads, streptavidin donor beads, universal buffer, and ½ area 96-well white opaque plates were purchased from Perkin Elmer. Antibodies used were tetraspanin specific anti-human CD9 (clone HI9a) and biotinylated anti-human CD81 (clone 5A6) antibodies acquired from Biolegend. The CD9 antibodies were conjugated to acceptor beads following a protocol provided by Perkin Elmer. Sodium cyanoborohydride and O-(Carboxymethyl)hydroxylamine hemihydrochloride necessary for acceptor bead conjugation were purchased from Sigma-Aldrich.

All samples, bead, and antibody solutions were diluted in 1× dilution buffer to the needed concentration. A standard was created using OPTIPREP™ derived exosomes and serially diluted with universal buffer to create concentrations from 1E11 P/mL to 1.6E9 P/mL. Liquid chromatography exosomes samples were tested both neat and at 2× dilution.

In the half area plate, 10 μL of 1.5 nM biotinylated CD81 antibody, 10 μL of 50 ug/mL acceptor bead solution, and 5 μL of samples/standards were added to each well. The plate was then incubated in RT for 1 hour. Following incubation, 25 μL of a 80 ug/mL solution of streptavidin donor bead solution were added and incubated in the dark for 1 hour. Finally, using an Alpha-capable BMG CLARIOSTAR® plate reader, the samples were read with an excitation of 680 nm and emission band-range of 520-620 nm.

For affinity size-exclusion chromatography (SEC) assays, exosome or exosome-antibody complex samples were analyzed on an ACCLAIM™ 1000A 7.8×150 mm column run at 0.3 mL/min. Mobile phase solution was 0.1M Na Phosphate, 0.2M NaCl, pH 7.2, and samples were injected at $2 \times 10^{11}$ particles/mL+/−170 ng anti-CD81_FITC antibody in 100 μL final volume.

Figure 2:
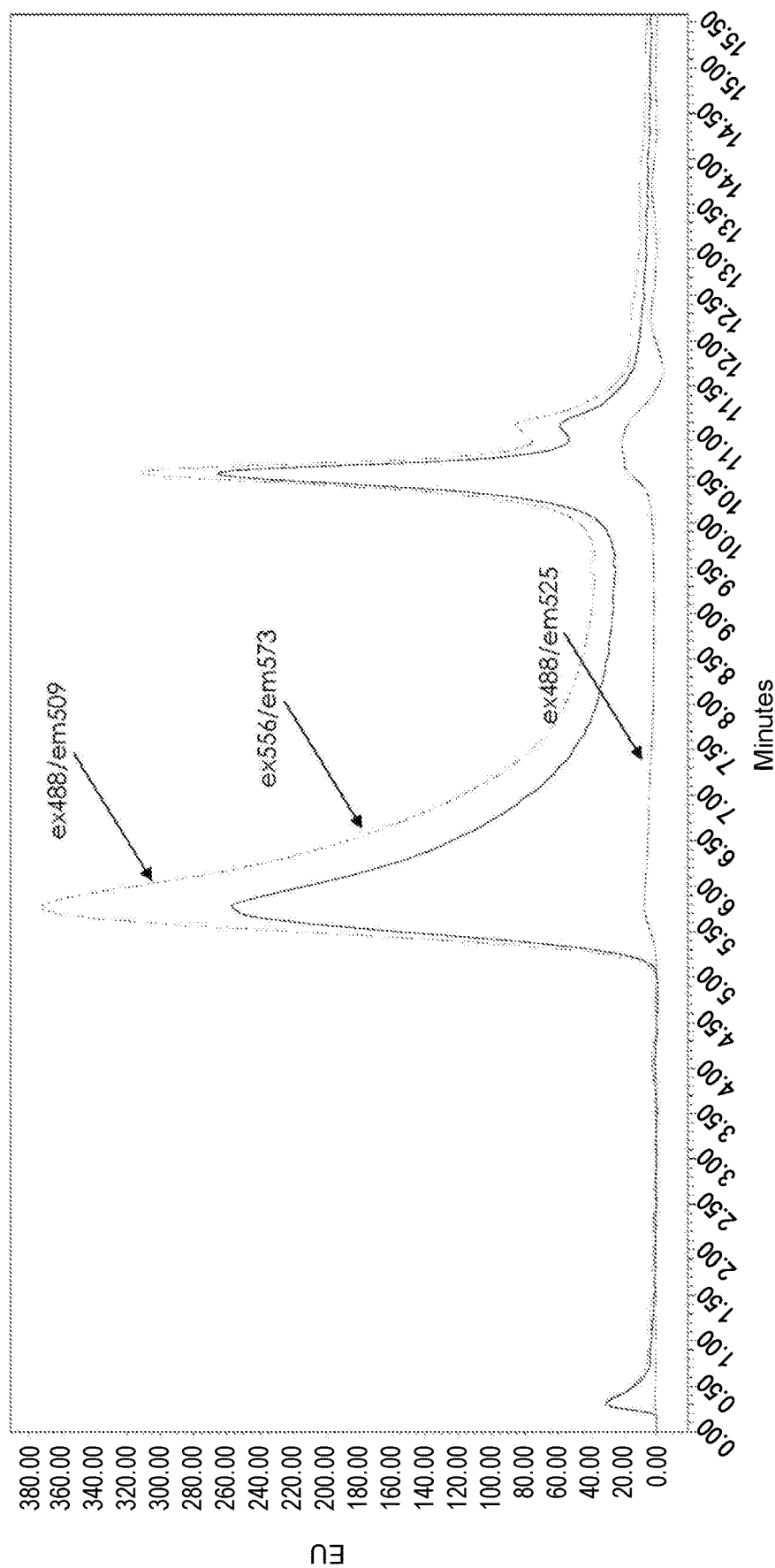
FIG. 2 shows an SEC trace of purified exosomes detected at 488 nm excitation/509 nm emission (ex488/em509): ex556/em573: and ex488/em525.
Figure 3:
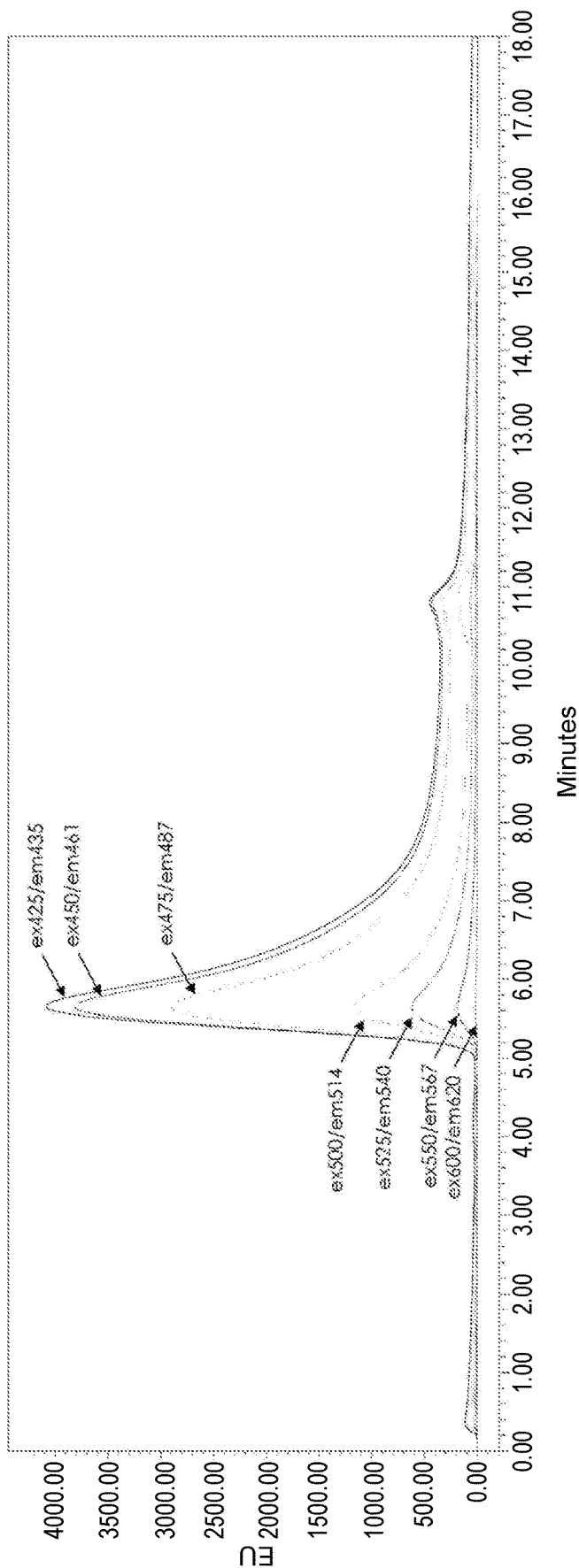
FIG. 3 shows an SEC trace of purified exosomes detected at a range of excitation and emission wavelengths at a fixed wave number shift from ex425 to ex 600.
Figure 4:
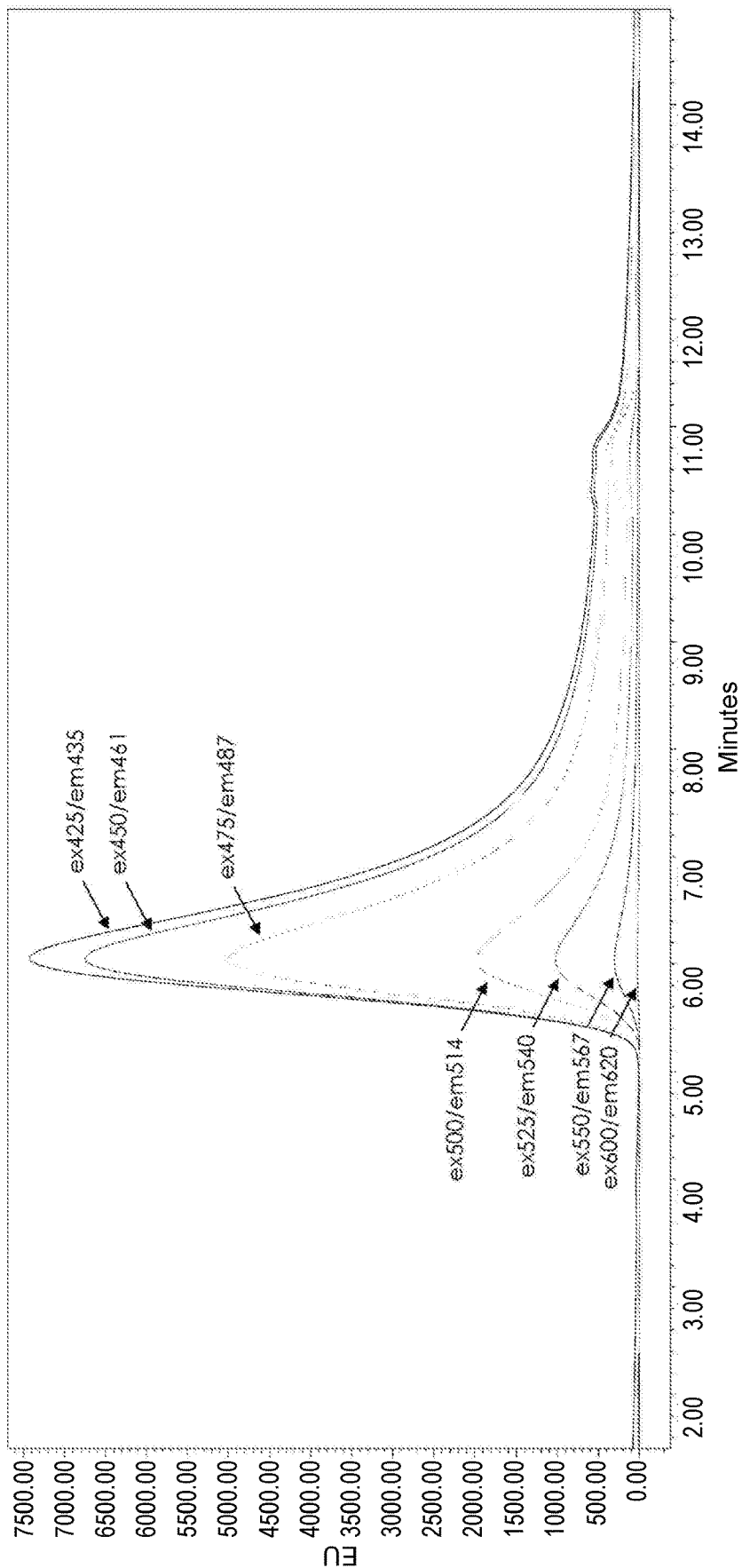
FIG. 4 shows an SEC trace of liposomes detected at a range of excitation and emission wavelengths at a fixed wave number shift from ex425 to ex 600.
Figure 5:
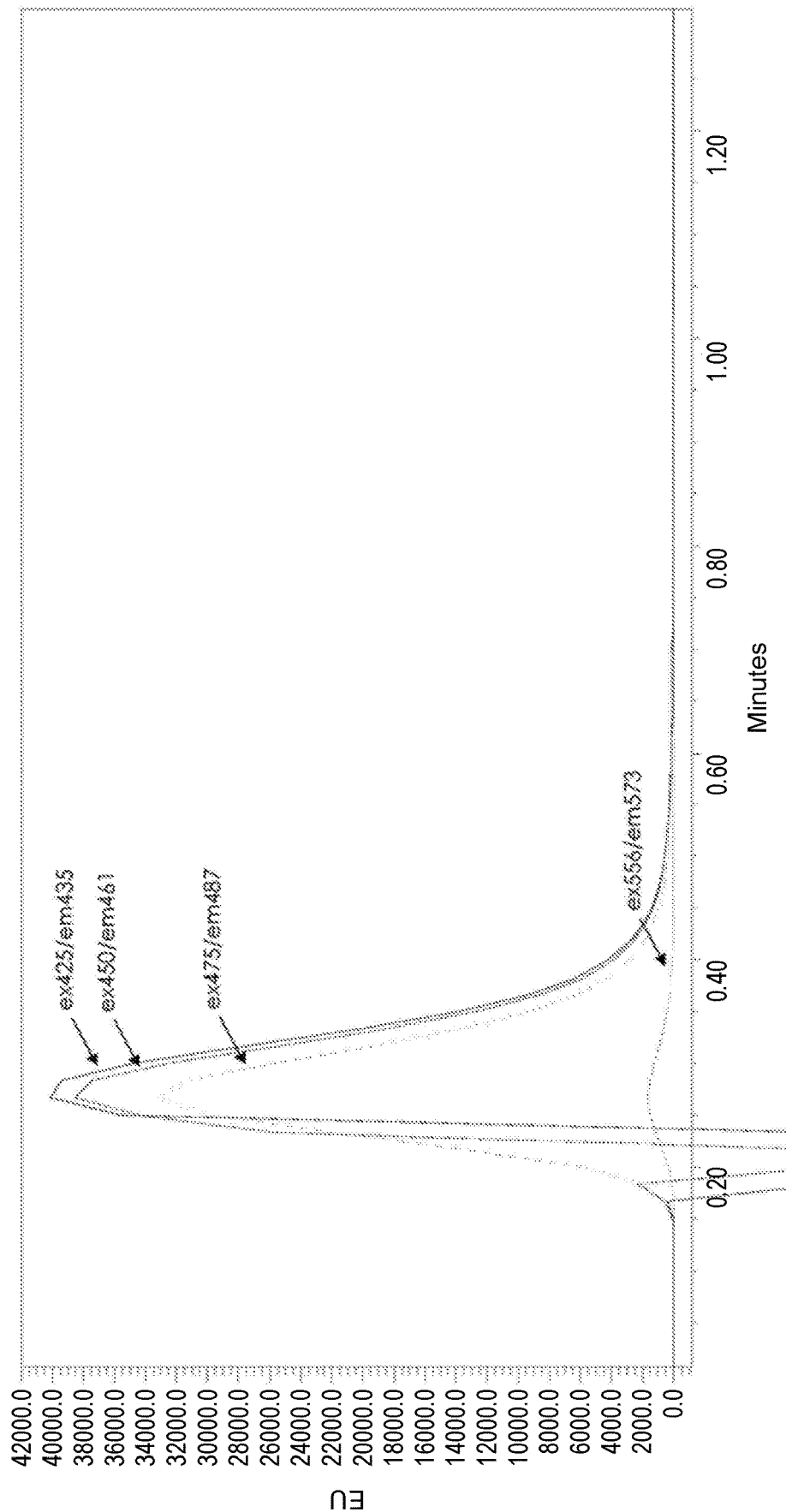
FIG. 5 shows an SEC trace of polystyrene beads detected at a range of excitation and emission wavelengths at a fixed wave number shift from ex425 to ex 556.

Example 1: Liposomes and Exosomes have Detectable Fluorescent Signal at Excitation and Emission Wavelengths with Similar Values Purified liposomes lacking a fluorescent marker (FormuMax Scientific Inc., Cat#F10104) were analyzed by size exclusion chromatography using an ACCLAIM™ SEC-1000 column. The SEC column was operated under isocratic flow at 0.5 mL/min using an Agilent 1100 HPLC system with PDA and fluorescence detectors. Samples were excited at UV wavelengths 488 nm and 556 nm and detected at fluorescence excitation and emission wavelength pairs 488/509, 556/573, and 488/525. The liposomes were detected at 488/509 and 556/573 but not at 488/525, despite very similar excitation and emission profiles for 488/509 and 488/525 runs (FIG. 1). Purified exosomes were analyzed by the same method and a similar trend was found, where the samples were detectable at the excitation/emission wavelength pairs that were separated by ~20 nm, but not in the 488/525 pair, which is separated by 37 nm (FIG. 2). Because of the consistent spectral properties at 488/509 and 556/573 it is unlikely that this activity profile is due to fluorescence, which is a resonant process. Instead, the consistent detection at excitation/emission wavelengths of similar values suggested that the detection of exosomes and liposomes was due to light scattering, which is non-resonant and can occur at many wavelengths. To determine whether the light scattering observed was Raman scattering or Rayleigh scattering, samples containing exosomes were scanned across a panel of excitation wavelengths and emission was measured at a fixed wave number shift (−533.6 cm$^{-1}$). As shown in FIG. 3, the exosomes were detected at almost all wavelengths tested at the fixed frequency shift. A similar trend was identified for liposomes (FIG. 4) and 100 nm polystyrene beads (Polysciences, Inc., Cat #64010) as well (FIG. 5). Because the scattering phenomenon was detectable for nanoparticles of diverse chemical composition, these results suggest that the scattering phenomenon is Rayleigh scattering. These results suggest that excitation/emission pairwise wavelengths of similar values can be used to very sensitively detect nanoparticles.

Example 2: Spectral Scanning of Purified Exosome Samples Across a Broad Frequency Range To determine whether the light scattering phenomenon described above persisted across a range of spectral values, purified exosomes were analyzed by SEC with excitation ranging from 400 nm to 690 nm, and emission detected at 10 nm above the excitation wavelength. For this experiment an ACCLAIM™-1000 SEC column (ThermoFisher Scientific) was operated under a 0.5 mL/min isocratic flow in a mobile phase of 100 mM Na-phosphate, 200 mM NaCl, pH 7.2 with the Waters 2695 ALLIANCE® HPLC system. A W2998 UV/Vis detector was used to monitor 210 nm, 254 nm, 280 nm wavelengths: and the W2475 fluorescence detector was used for 3D spectral scanning from the 400 nm to 700 nm range.

The fluorescence excitation wavelength was fixed in 10 nm increments through multiple injections, and the emission was read from 10 nm greater than excitation, up to 700 nm. For example, the first injection had a fixed excitation 400 nm, and the emission scan was from 410 nm to 700 nm. A total of 30 injections were tested in the 400-700 nm excitation/emission range. An additional injection was tested at 280 nm excitation and emission of 290-700 nm, to observe intrinsic tryptophan fluorescence of the exosomal proteins and other proteins in the injection.

The ACCLAIM™ SEC-1000 column has a mono-dispersed multi-pore hydrophilic resin, with pore sizes of 100 nm. The large pore size allowed elution of exosomes largely in the void volume peak, with smaller non-exosomal material largely eluting in the column volume.

Figure 6:
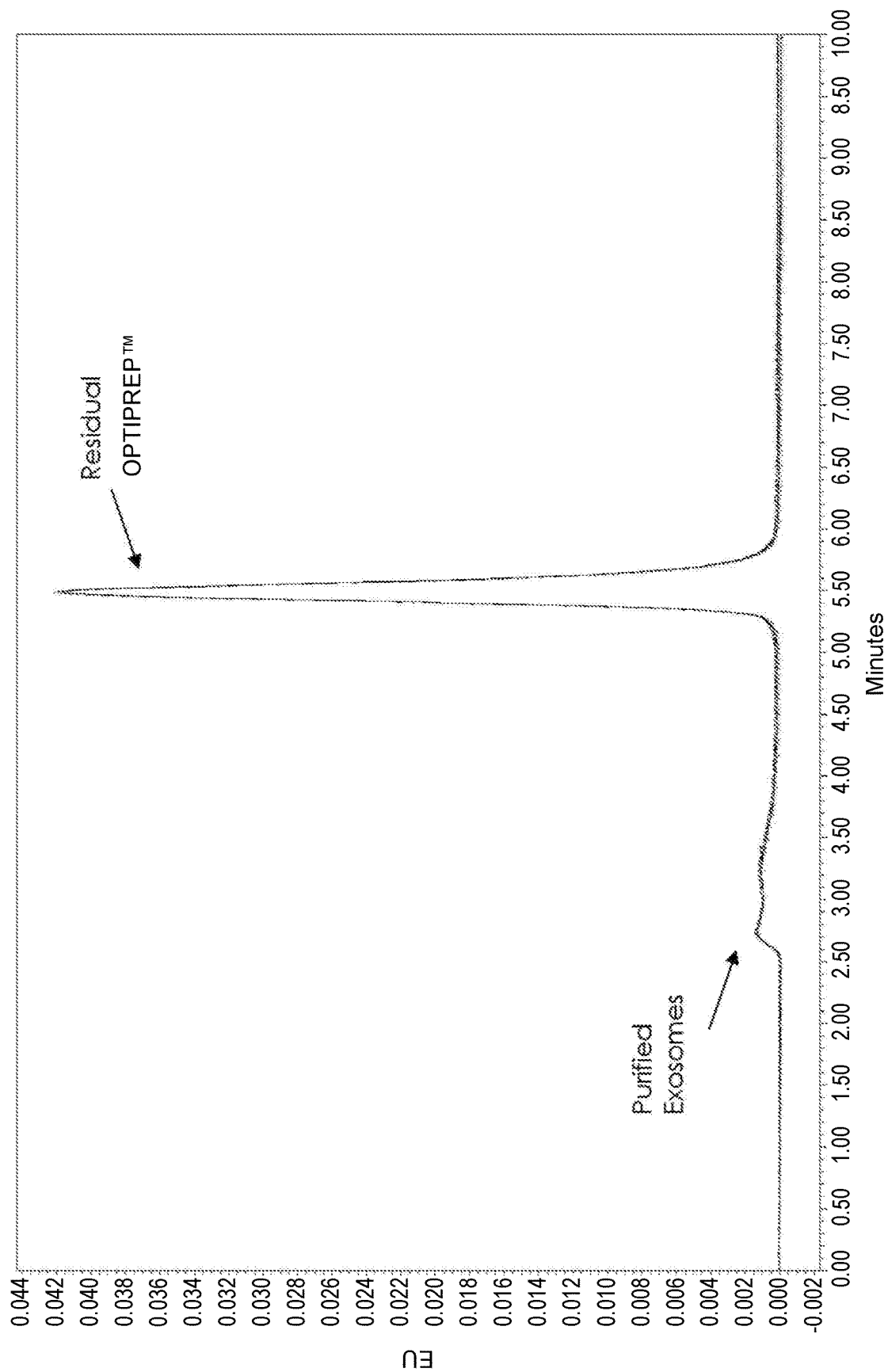
FIG. 6 shows an SEC trace of EV reference standard detected at ex280/em350 and ex460/em470.

To confirm the ability of distinguishing nanoparticles and other fractions in the samples, a EV reference standard was injected and measured at emission wavelengths of 350 nm and 470 nm, after the sample was excited at wavelengths of 280 nm and 460 nm, respectively. The normalized chromatogram (FIG. 6) showed that robust light scattering emission signal (ex460/em470) and intrinsic fluorescence (ex280/em350) at Y-axis were detected in the void volume (X-axis) at about 10 min to about 13 min, peaked at about 12 min. Consistent with the signature elution time for exosomes in the ACCLAIM™ SEC-1000 column, both signals indicated exosomal proteins. The next signal was detected at about 13 min to about 16 min for intrinsic fluorescence (ex280/em350), without the concurrent light scattering emission signal at ex460/em470. It indicated that the elution was dominated by proteinaceous species, but not large particles that would cause light scattering. By comparing the light scattering emission signal and the intrinsic fluorescence from the SEC chromatogram, the proteins from exosomes and other proteins in solutions can be distinguished.

Figure 7:
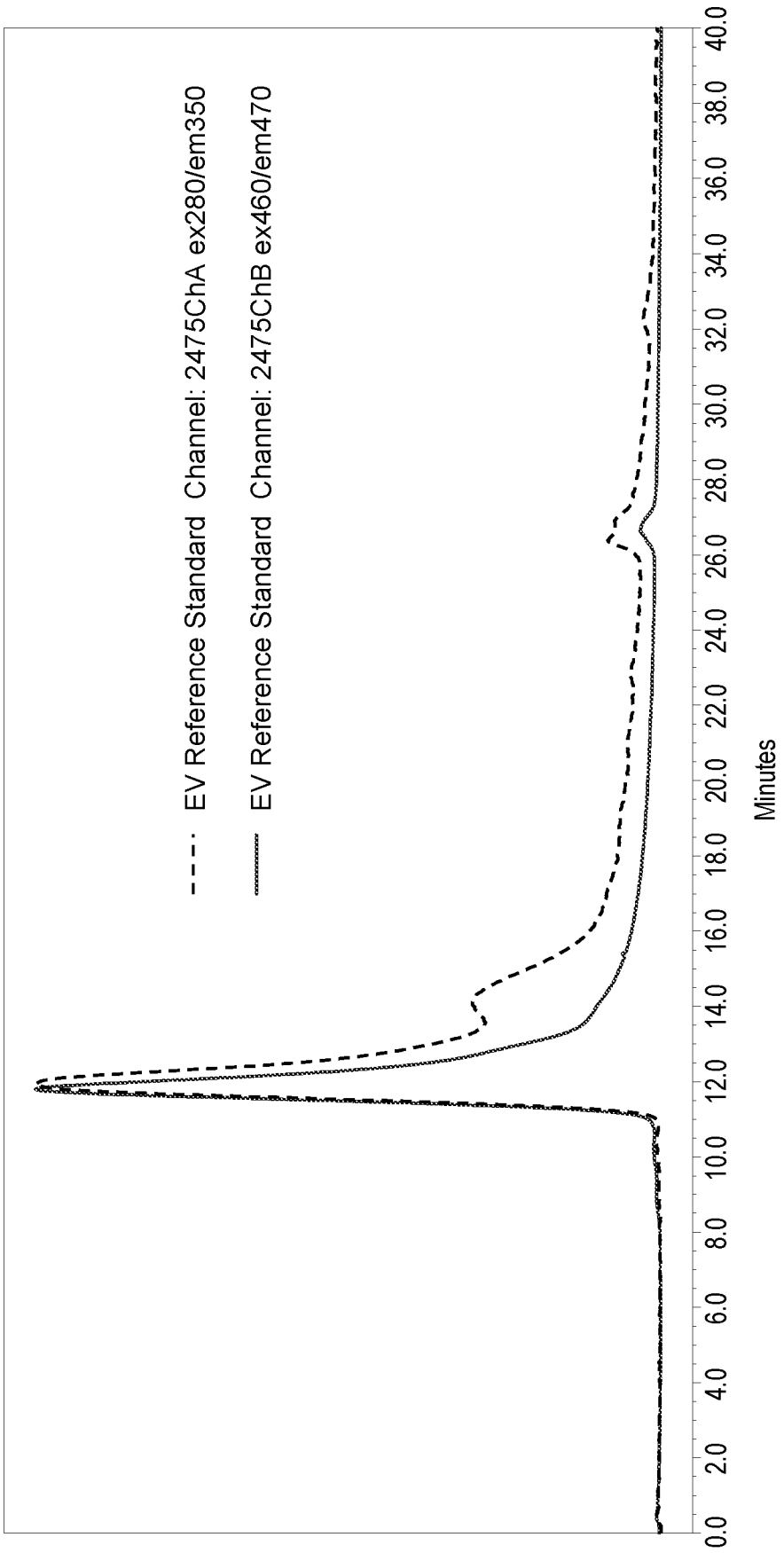
FIG. 7 shows an overlay of 30 independent SEC runs of purified exosomes monitored at UV280.

To confirm that the 30 repeat injections would not cause column fouling or a loss of performance, 30 samples of purified exosomes were injected and monitored at UV280. The chromatograms showed very consistent performance across all injections (FIG. 7).

Figure 8:
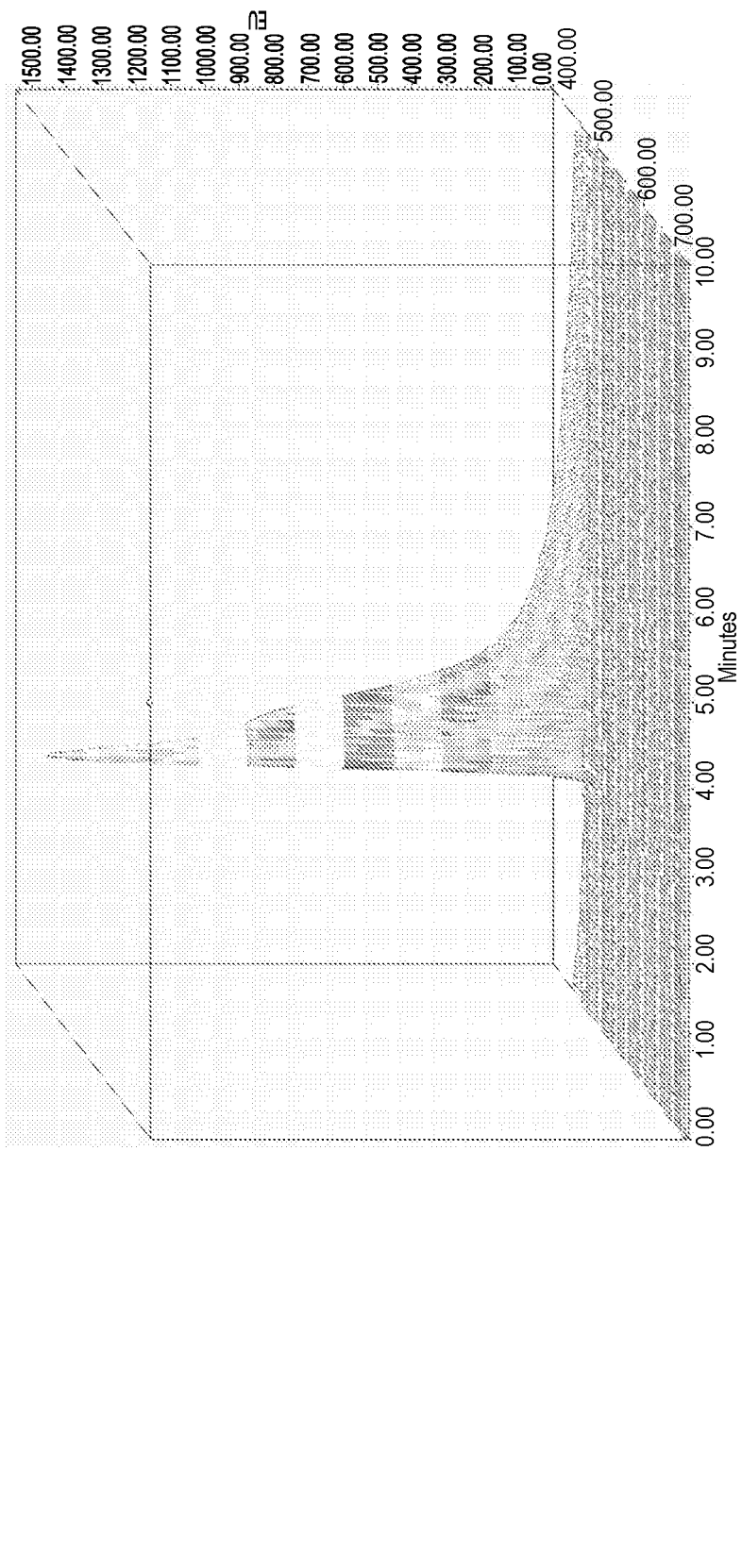
FIG. 8 shows a spectral scan of purified exosomes monitored by SEC with excitation wavelength at 460 nm and emission wavelength ranging from 470 nm-700 nm.

Excitation at any wavelength from 400 nm-690 nm resulted in a robust signal (Y-axis) that was detected in the void volume (X-axis) with a maximum value at 10 nm greater than the excitation wavelength (Z-axis). Excitation at the wavelength of 460 nm has a strong light emission signal at ~470 nm emission wavelength as shown in FIG. 8. The maximum emission peak area of the excitation wavelength ranging from 400 nm to 690 nm was the area automatically chosen from the range of emissions, but it was the Δ10 nm wavelengths. The maximum emission peak areas were recorded in Table 2 below. The largest value was observed at ex460/em470.

TABLE 2

| Channel, wavelength (nm) | Max Emission Peak Area |
| --- | --- |
| ex400/em410 | 830193084 |
| ex410/em420 | 798009672 |
| ex420/em430 | 840065224 |
| ex430/em440 | 821002274 |
| ex440/em450 | 761446845 |
| ex450/em460 | 856465315 |
| ex460/em470 | 893639118 |
| ex470/em480 | 654812166 |
| ex480/em490 | 553275574 |
| ex490/em500 | 473088187 |
| ex500/em510 | 289960311 |
| ex510/em520 | 297954040 |
| ex520/em530 | 218366779 |
| ex530/em540 | 148545950 |
| ex540/em550 | 121265753 |
| ex550/em560 | 93561988 |
| ex560/em570 | 86845767 |
| ex570/em580 | 64863258 |
| ex580/em590 | 51725098 |
| ex590/em600 | 37177538 |
| ex600/em610 | 25528170 |
| ex610/em620 | 15809588 |
| ex620/em630 | 14544126 |
| ex630/em640 | 11837506 |
| ex640/em650 | 7641038 |
| ex650/em660 | 5242144 |
| ex660/em670 | 3086316 |
| ex670/em680 | 2152806 |
| ex680/em690 | 870232 |
| ex690/em700 | 555385 |

Figure 9:
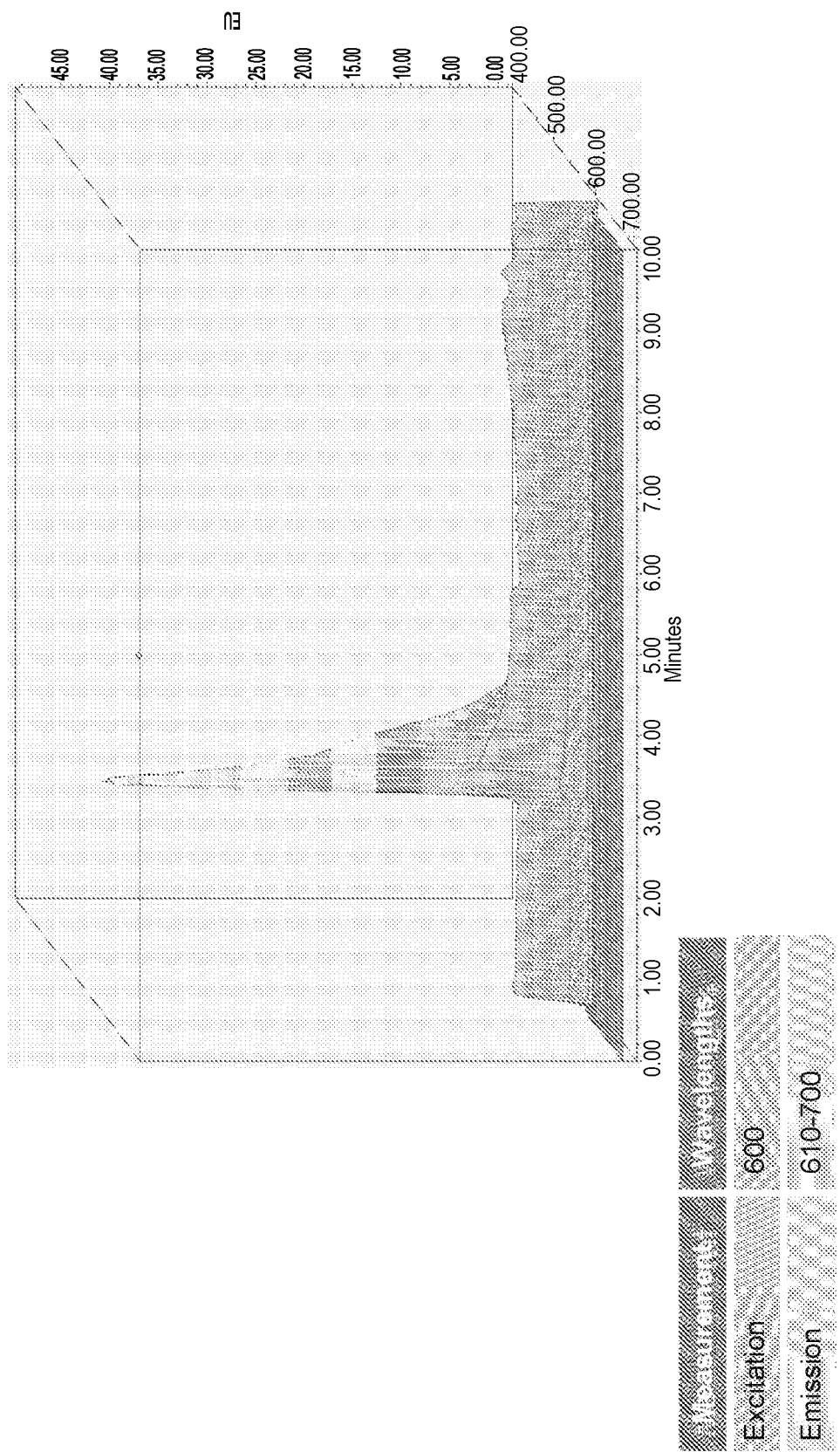
FIG. 9 shows a spectral scan of purified exosomes monitored by SEC excitation wavelength at 600 nm and emission wavelength ranging from 610 nm-700 nm.
Figure 10:
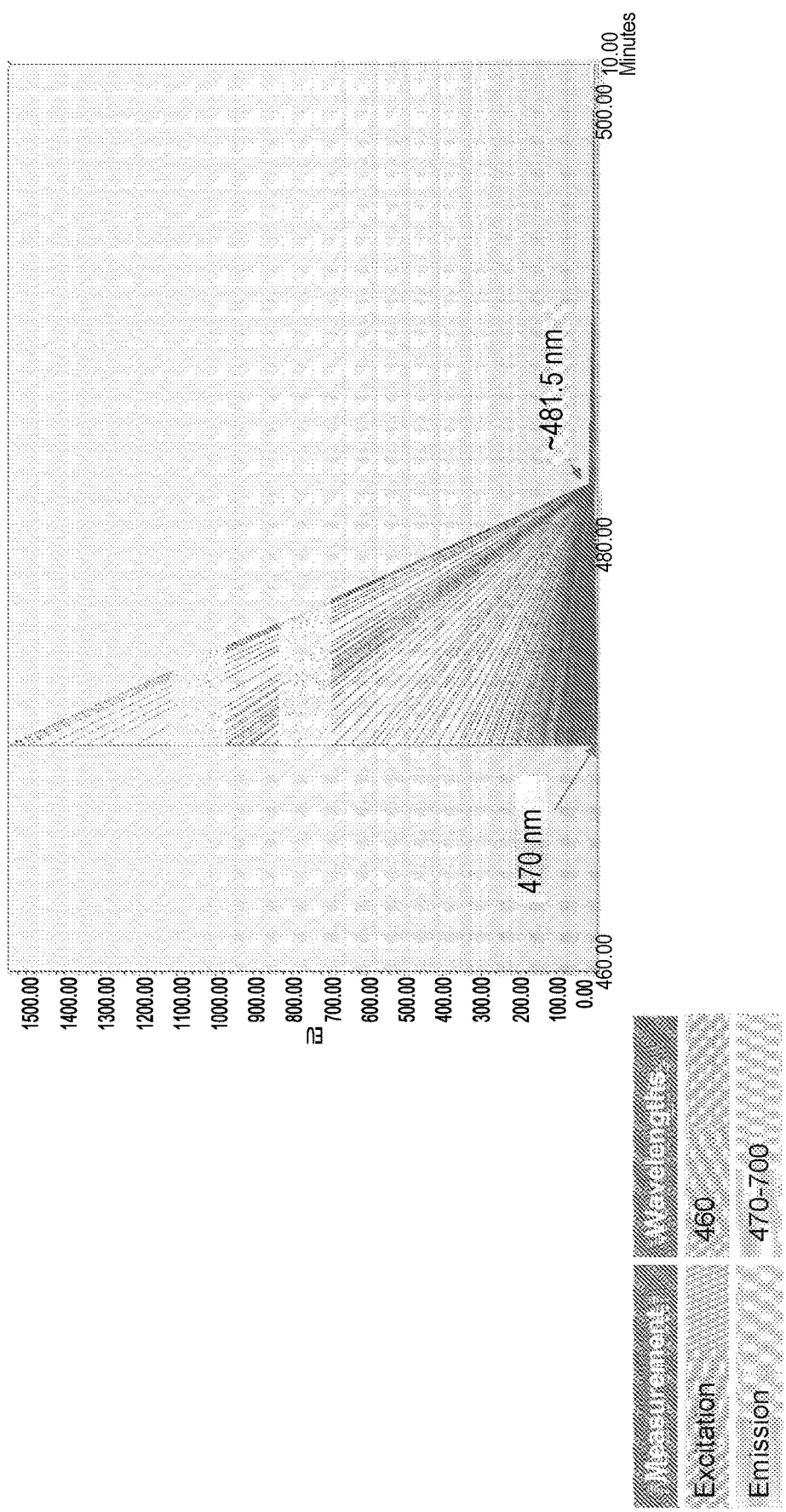
FIG. 10 shows an SEC trace of purified exosomes monitored with excitation at 460 nm and emission measured from 470 nm-700 nm. Detectable emission signal is dramatically lost at ~21 nm above the excitation signal.
Figure 11:
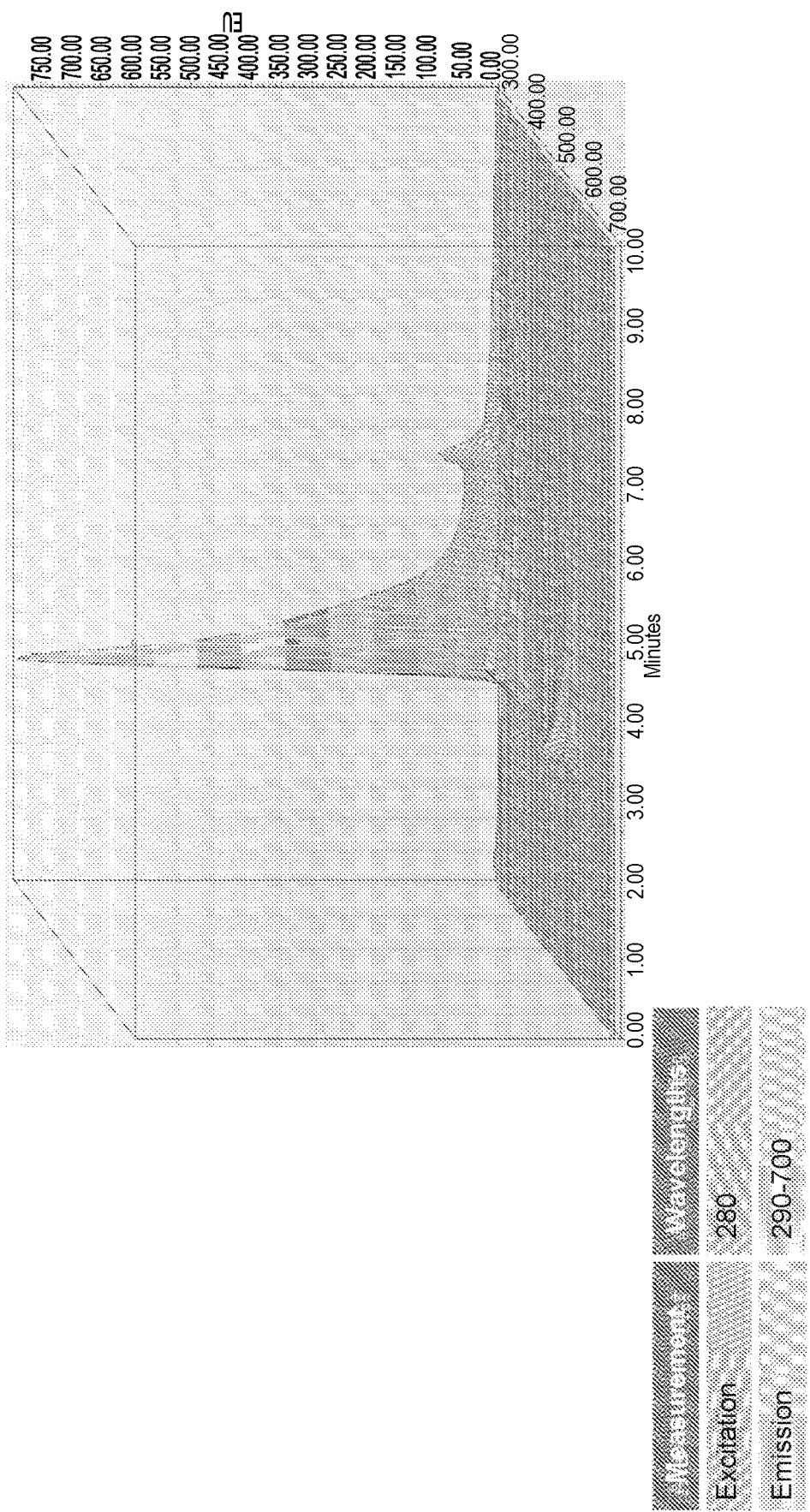
FIG. 11 shows a spectral scan of purified exosomes monitored by SEC with excitation at 280 nm and emission ranging from 290 nm-700 nm.
Figure 12:
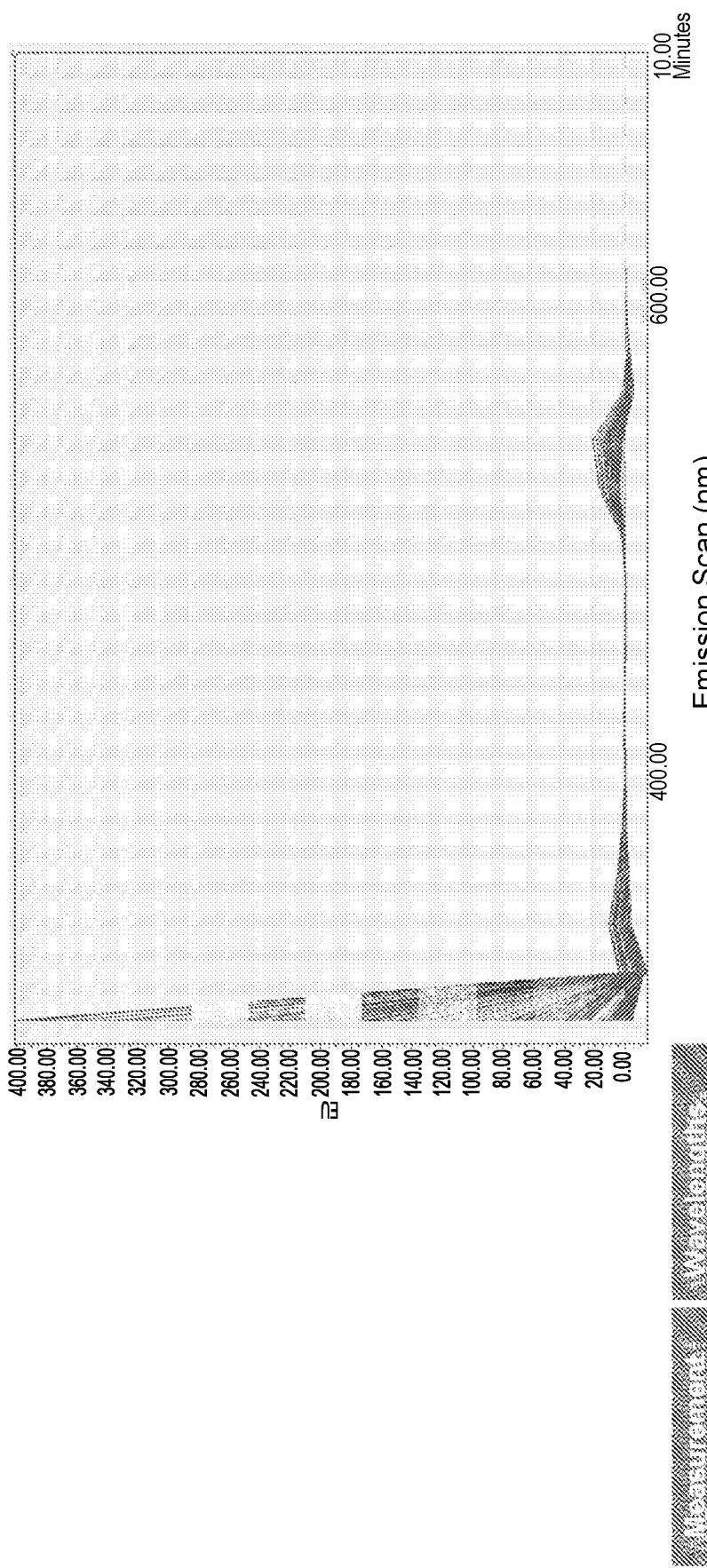
FIG. 12 shows an SEC trace of purified exosomes monitored with excitation at 280 nm and emission measured from 290 nm-700 nm. Detectable emission signal is dramatically lost at ~20 nm above the excitation signal.

The emission signal dropped precipitously after 20 nm greater than the excitation wavelength (see, for example, FIG. 9, where the signal at ~3 minutes drops rapidly at wavelengths more than 20 nm greater than the excitation wavelength of 600 nm). The detectable signal at a given wavelength is almost completely lost at >22 nm from the excitation wavelength. For example, after excitation at 460 nm, the emission signal is lost at values greater than 481.5 nm (FIG. 10). Spectral scanning at a shorter wavelength such as 280 nm resulted in a spectrum that contained interfering signal from non-exosomal proteins or other debris (e.g., the signal at 6 minutes, and the void volume signal at em/350) and ~em/550) (FIGS. 11-12).

Figure 13:
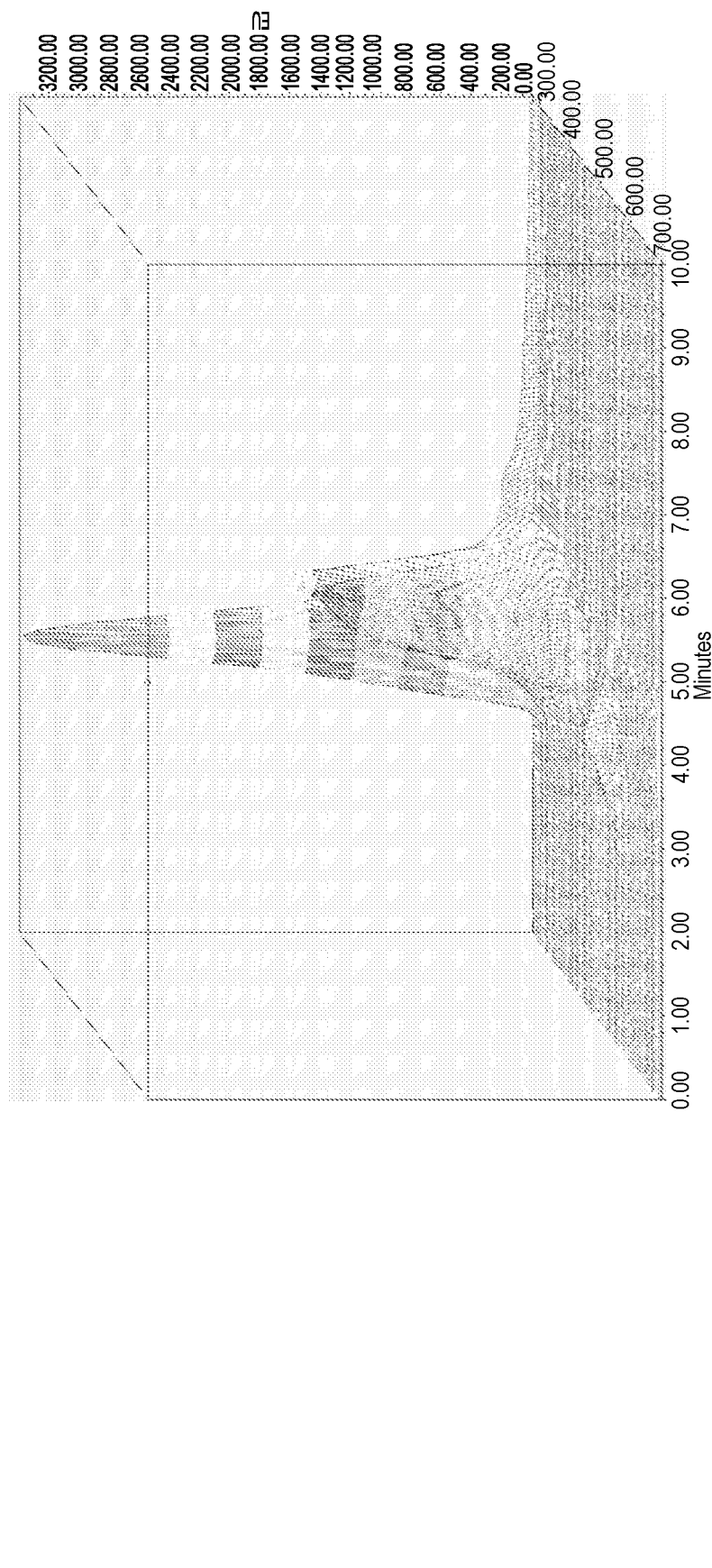
FIG. 13 shows a spectral scan of an impure exosome preparation monitored by SEC with excitation at 280 nm and emission ranging from 290 nm-700 nm.
Figure 14:
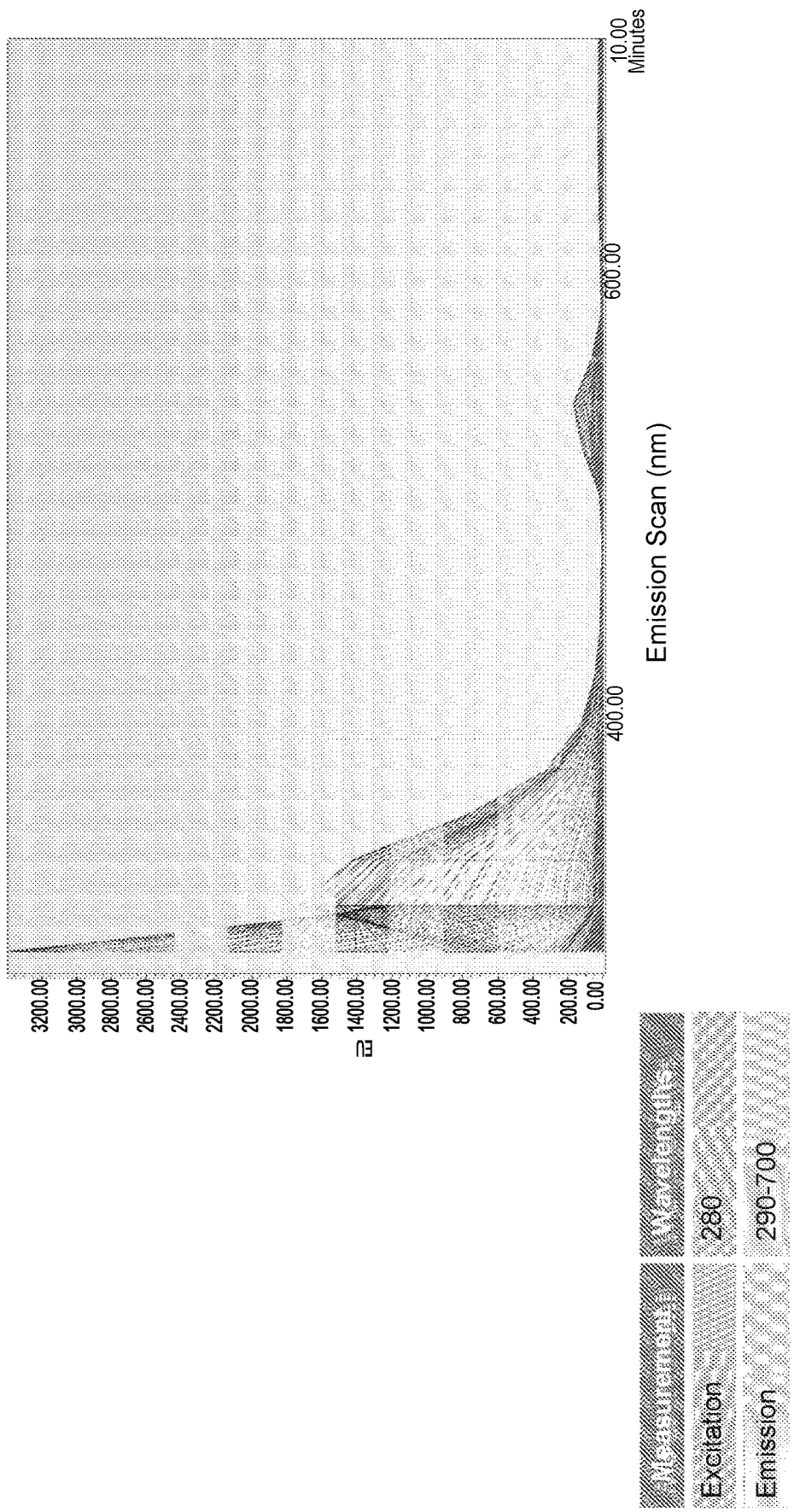
FIG. 14 shows an SEC trace of an impure exosome preparation monitored with excitation at 280 nm and emission measured from 290 nm-700 nm. Detectable emission signal is dramatically lost at ~20 nm above the excitation signal and can be resolved from the contaminating protein fluorescence at 350 nm.

To determine whether nanoparticles in a complex matrix could be detected by their light scattering signature, cell culture harvest was processed to remove cells and concentrated by ultrafiltration. The product was then analyzed by SEC with excitation at 280 nm and scanning from 290 nm-700 nm. As shown in FIG. 13, the emission signal at 290 nm in the void volume can be clearly separated from the abundant contaminating proteins eluting in the void volume and at later time points, all of which are predominantly detected at 350 nm emission. Fixing the elution time to the column volume, the 290 nm peak is clearly resolvable from the peaks detected at 350 nm and above (FIG. 14).

Example 3: Spectral Properties of Additional Nano-Sized Biological Substrates

Figure 15:
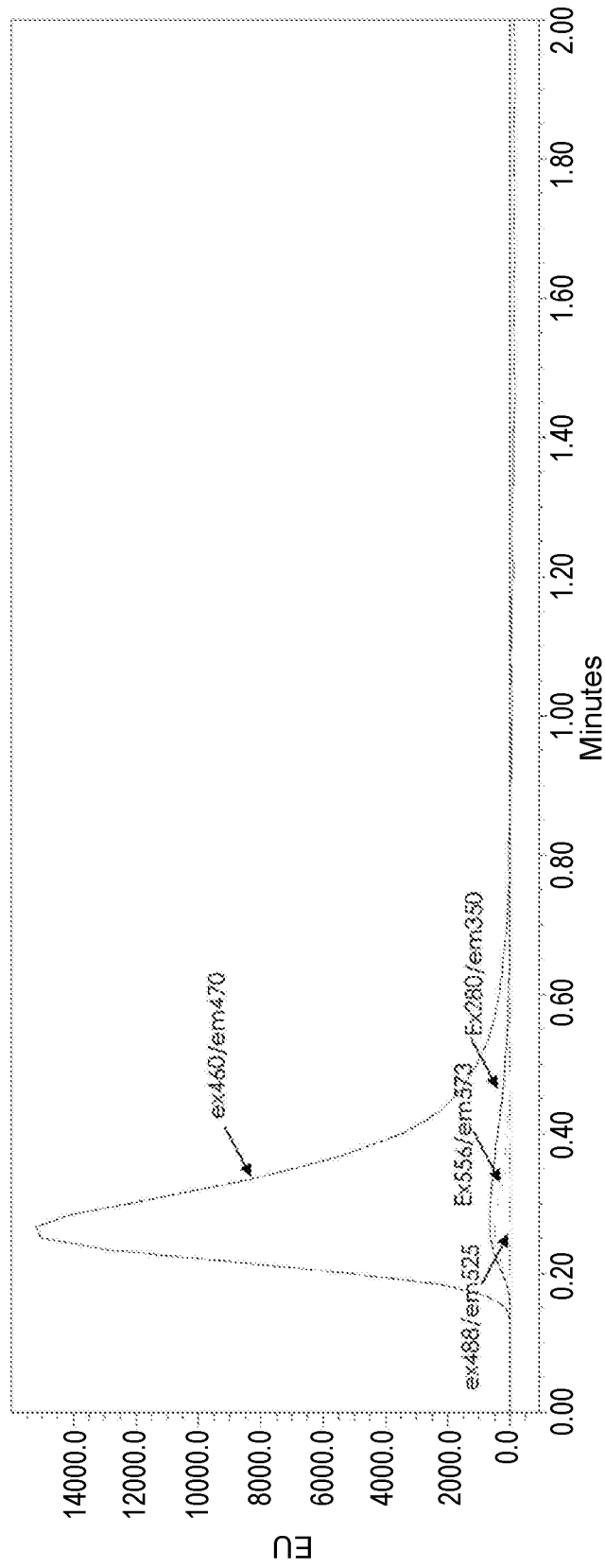
FIG. 15 shows an SEC trace of E. coli ribosomes detected at ex460/em470, ex556/em573, ex280/em350, and ex488/em525.
Figure 16:
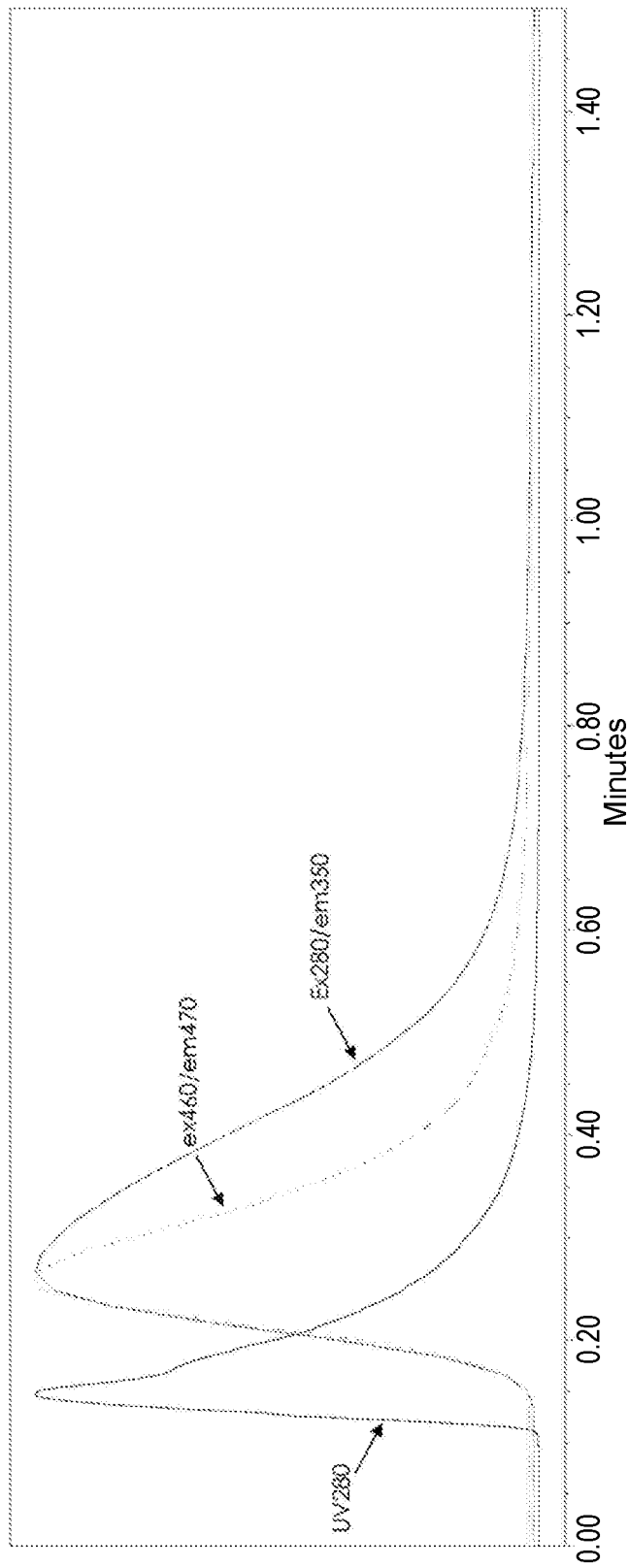
FIG. 16 shows an SEC trace of E. coli ribosomes detected at ex460/em470, ex280/em350, and UV280 normalized to match peak heights.

To understand whether the light scattering observations shown in the previous examples were specific to spherical particles, a similar experiment was carried out by analyzing purified *E. coli* ribosomes (~25 nm diameter near-spherical particles: New England Biolabs: #P0763S) at UV280, ex280/em350, ex460/em470), ex556/em573, and ex488/em525. As shown in FIG. 15, ex280/em350, which detects protein tryptophan fluorescence, and the ex/em pairs separated by 10-20 nm reliably detected the same peak of purified ribosomes. Monitoring at ex488/em525 failed to detect any signal. These results are consistent with the observations shown above, wherein excitation and emission pairs separated by less than 20 nm can detect nano-sized particles by SEC, whereas ex/em pairs of a greater separation, such as ex488/em525 fail to detect the particles. Notably, ex460/em470 yielded a much greater signal than even ex280/em350. Normalizing maximum signal peak height revealed that the detected peak by ex460/em470 was sharper than ex280/em350 (FIG. 16). The UV280 trace is time-shifted relative to the fluorescence traces due to its location at a different point of the flow path.

Figure 17:
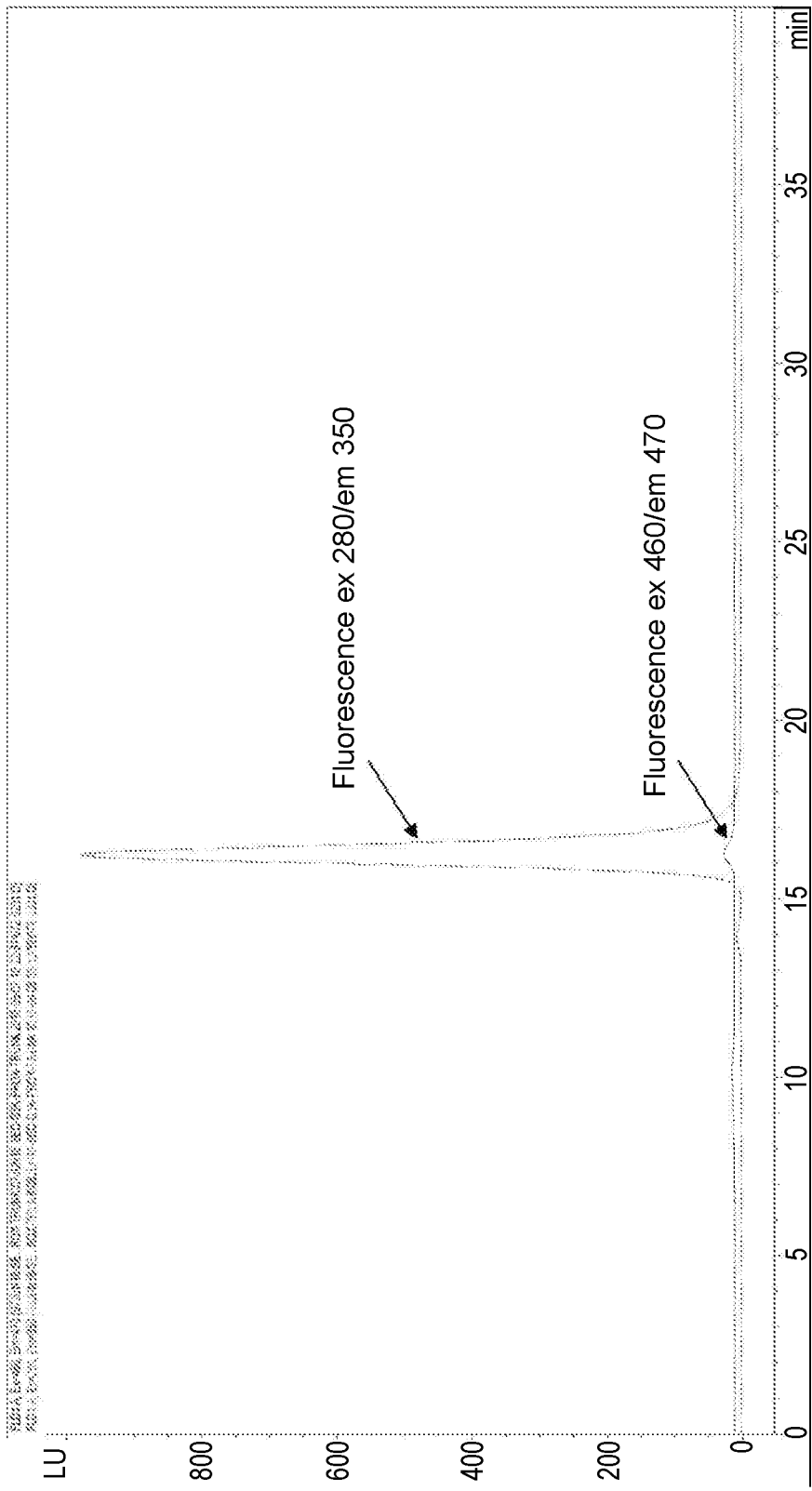
FIG. 17 shows an SEC trace of a purified monoclonal antibody detected at ex460/em470 and ex280/em350.
Figure 18:
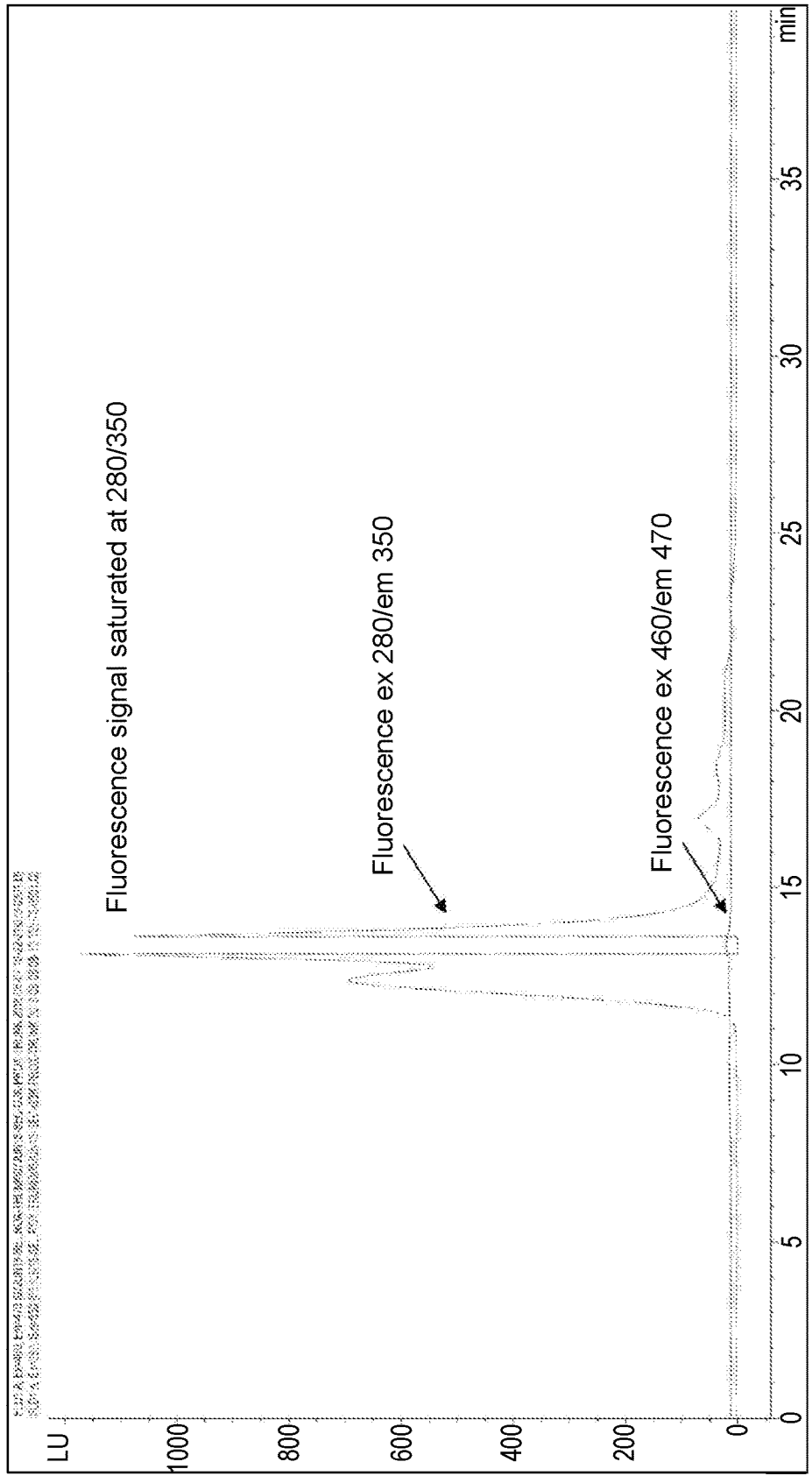
FIG. 18 shows an SEC trace of purified PTGFRN extracellular domain detected at ex460/em470 and ex280/em350.

The light scattering characteristics of two additional nano-sized biological particles were analyzed by SEC. In this experiment, a Tosoh TSKGEL® G3000SWx1 7.8x30 cm SEC column was operated under isocratic flow at 0.5 mL/min using an AGILENT 1100 HPLC system with PDA and fluorescence detectors. UV wavelengths 210 nm, 254 nm, 280 nm were monitored, as well as fluorescence excitation and emission wavelength pairs 280/350 and 460/470. The G3000SWx1 column is a silica-based mono-dispersed multi-pore hydrophilic resin, with pore sizes of approximately 25 nm. The mobile phase used was 0.1 M Na-phosphate, 0.2 M NaCl, pH 6.8. Two non-spherical recombinant proteins, purified monoclonal antibody and purified PTGFRN extracellular domain, were injected and monitored. PTGFRN is a highly glycosylated exosome surface protein that is believed to form a rod-like structure, dimerizes in vitro and in vivo, and elutes by SEC at a significantly greater apparent size than its actual ~98 kDa monomeric molecular weight (see Provisional U.S. Patent Application No. 62/656,956, which is incorporated in its entirety herein). Both the recombinant antibody and recombinant PTGFRN were detected as single peaks at ex280/em350 but were essentially undetectable at ex460/em470 (FIGS. 17-18, compared to FIG. 15).

The invention claimed is:

1. A method of detecting a nanoparticle that does not include a dye, fluorophore, marker or an imaging compound, comprising determining a light scattering emission signal from a sample suspected of comprising the nanoparticle,
   wherein the light scattering emission signal is not fluorescence or plasmonic and is detected by measuring an emission wavelength from the sample, and when an emission wavelength is detected that is between about 1 nm to about 20 nm longer than an excitation wavelength applied to the sample, the presence of the nanoparticle is indicated,
   wherein the nanoparticle does not include a dye, fluorophore, marker or imaging compound,
   wherein the nanoparticle is selected from a ribosome, a polymeric bead, a metallic bead, a liposome, a lipid nanoparticle, an exosome, or a combination thereof, and
   wherein the light scattering emission signal is determined at an emission wavelength range of about 300 nm to about 600 nm.

2. The method of claim 1, wherein the light scattering emission signal is generated by exciting the sample with a light source having an excitation wavelength ranging from about 280 nm to about 700 nm.

3. The method of claim 1, wherein (i) the light scattering emission signal is determined at an emission wavelength range of about 400 nm to about 500 nm, (ii) the light scattering emission signal is determined at an excitation wavelength range of about 400 nm to about 500 nm, or (iii) both (i) and (ii).

4. The method of claim 2, wherein the excitation wavelength is about 460 nm and the emission wavelength is about 460 nm to about 480 nm, and wherein the excitation wavelength is the same or shorter than the emission wavelength.

5. The method of claim 4, wherein the excitation wavelength is about 460 nm and the emission wavelength is about 470 nm.

6. The method of claim 2, wherein the excitation wavelength is about 450 nm and the emission wavelength is about 450 nm to about 470 nm, and wherein the excitation wavelength is the same or shorter than the emission wavelength.

7. The method of claim 2, wherein the excitation wavelength is about 470 nm and the emission wavelength is about 470 nm to about 490 nm, and wherein the excitation wavelength is the same or shorter than the emission wavelength.

8. The method of claim 2, wherein the excitation wavelength is about 550 nm to about 560 nm and the emission wavelength is about 550 nm to about 580 nm, and wherein the excitation wavelength is the same or shorter than the emission wavelength.

9. The method of claim 1, further comprising separating the sample into fractions prior to determining the light scattering emission signal.

10. The method of claim 9, wherein the separating comprises one or more column chromatography separation steps.

11. The method of claim 1, further comprising subjecting the sample to: (i) a filtration step prior to determining the light scattering emission signal; (ii) a centrifugation separation step prior to determining the light scattering emission signal; (iii) a sucrose density gradient step prior to determining the light scattering emission signal; or (iv) any combination of (i), (ii), and (iii).

12. The method of claim 1, further comprising: (i) determining an amount of the nanoparticle within the sample comprising comparing the light scattering emission signal to the light scattering emission signal of a standard; (ii) quantifying an amount of the nanoparticle within the sample, based upon the area under of the curve of a chromatogram comprising the light scattering emission signal; (iii) determining an amount of the nanoparticle within the sample comprising comparing the light scattering emission signal to the luminescence signal of a standard; or (iv) any combination of (i), (ii), and (iii); wherein the standard is determined using a luminescence proximity assay or calculated based on the relative abundance of one or more nanoparticle-associated proteins.

13. The method of claim 1, wherein the nanoparticle is an exosome.

14. The method of claim 1, wherein the light scattering emission signal is measured during one or more batch release assays.

15. The method of claim 1, further comprising measuring an intrinsic fluorescence of the nanoparticle in the sample.

16. The method of claim 15, wherein the intrinsic fluorescence is measured after the nanoparticle of the sample are excited at an excitation wavelength of about 280 nm to about 700 nm; and wherein the intrinsic fluorescence is emitted at a wavelength ranging from about 290 nm to about 700 nm.

17. The method of claim 15, wherein both the light scattering emission signal and the intrinsic fluorescence are measured during one or more release assays.

18. The method of claim 15, further comprising measuring a UV absorbance of the nanoparticle in the sample.

19. The method of claim 18, wherein the UV absorbance is measured at 280 nm after the sample is excited by a UV light at the wavelength of 280 nm.

20. The method of claim 1, wherein the emission wavelength is about 10 nm longer than the excitation wavelength.

\* \* \* \* \*

UNITED STATES PATENT AND TRADEMARK OFFICE
CERTIFICATE OF CORRECTION

| | | |
|---|---|---|
| PATENT NO. | : 12,066,382 B2 | Page 1 of 1 |
| APPLICATION NO. | : 17/254221 | |
| DATED | : August 20, 2024 | |
| INVENTOR(S) | : Young Jun Choi et al. | |

It is certified that error appears in the above-identified patent and that said Letters Patent is hereby corrected as shown below:

On the Title Page

Item (63) please insert:
-- Related US Application Data
Provisional application No. 62/688,304, filed June 21, 2018. --

Signed and Sealed this
Twenty-fourth Day of September, 2024

Katherine Kelly Vidal
*Director of the United States Patent and Trademark Office*